United States Patent [19]
Dunn et al.

[11] Patent Number: 6,138,008
[45] Date of Patent: Oct. 24, 2000

[54] WIRELESS TELEPHONE MENU SYSTEM

[75] Inventors: Peter Dunn, Lincroft; James Kemble, Bridgewater; Gregory Pulz, Somerset; Alan Ira Schwartz, Bridgewater; Barry Shawn Seip, New Providence, all of N.J.

[73] Assignee: AT&T Corp., New York, N.Y.

[21] Appl. No.: 09/008,639

[22] Filed: Jan. 16, 1998

[51] Int. Cl.[7] .................................................. H04M 3/42
[52] U.S. Cl. ........................... 455/414; 455/456; 455/517
[58] Field of Search ..................................... 455/412, 413, 455/414, 417, 456, 461, 517, 524, 422, 433; 379/201, 210, 214, 218, 354

[56] References Cited

U.S. PATENT DOCUMENTS

| | | | |
|---|---|---|---|
| 4,930,152 | 5/1990 | Miller | 379/214 |
| 5,406,616 | 4/1995 | Bjorndahl | 455/414 |
| 5,519,760 | 5/1996 | Borkowski et al. | 455/456 |
| 5,528,558 | 6/1996 | Mardhekar et al. | 379/354 |
| 5,539,809 | 7/1996 | Mayer et al. | 379/201 |
| 5,572,577 | 11/1996 | Harrila | 379/214 |
| 5,659,596 | 8/1997 | Dunn | 455/456 |
| 5,818,920 | 10/1998 | Rignell et al. | 455/422 |
| 5,943,397 | 8/1999 | Gabin et al. | 379/201 |

*Primary Examiner*—Reinhard J. Eisenzopf
*Assistant Examiner*—Lester G. Kincaid

[57] ABSTRACT

A method for completing a telephone call originating from a calling party to a called party. The method determines the time zone at a first cell location associated with the originating calling party. It also determines the time zone at a second location associated with the called party. A comparison is made between the time zone associated with the calling party with the time zone associated with the called party. An announcement associated with the time of day is made to the calling party if the time zone associated with the calling party is not the same as the time zone associated with the called party. The system provides the calling party with a menu of options for completing a telephone call to the called party when the calling party receives either a busy signal, a ring no answer response, a message that said called party's telephone has been changed or a message that said called party's telephone is out of service. A response is inputted corresponding to a selected one of the options included in the menu. The selected option is processed during the telephone call connection attempt.

25 Claims, 23 Drawing Sheets

WIRELESS TELEPHONE MENU SYSTEM

FIELD OF INVENTION

The present invention relates generally to communication systems and more particularly to a system for providing a cellular caller with various alternatives if a telephone call is not completed.

BACKGROUND OF THE INVENTION

Currently, there are various service alternatives offered to telephone users which attempt to complete a telephone call between two parties when the call is not answered for any number of reasons. A telephone user may employ a hardware receiver as well as software alternatives incorporated into existing telephone networks to complete a call. For example, AT&T, the assignee of the present invention, provides a service known as "True Messages"$^{SM}$ which is available in most geographical areas. With this type of service, if a called party does not answer an incoming call, the calling party receives an announcement, initiated by the telephone carrier, asking if the calling party would like to leave a message. If a message is left, the called party is notified that a message is waiting when the called party picks-up their telephone. This messaging service has similar functionality to "voicemail", however voicemail is typically stored in a local platform whereas a service such as True Messages is stored in a separate enhanced service provided platform provided in communication with the public switched telephone network ("PSTN"). A drawback associated with this messaging service is that typically the calling party is limited to only leaving a message for the called party and does not provide additional processing options.

Another type of telephone service, distinct from the messaging service, is known as a "return call" or "call-back" feature which allows a calling party to receive a return call from the called party when a busy signal or a ring-no-answer situation prevented the original call from being completed. However, this type of service is not available to parties calling from wireless/cellular telephones. The service is difficult to implement because the call-back system must direct the call-back to the location of the cellular phone. The location may change. Another disadvantage associated with the call-back feature is that the calling party wishing to initiate the call-back process must enter a series of user identification numbers. Moreover, the call-back feature is not available in real-time. In other words, when the calling party receives a busy signal or a ring-no-answer during the original call connection attempt, the calling party must first hang-up and terminate the original call before initiating the call back feature. In addition, present call-back services do not allow the calling party to cancel a call-back request once it has been initiated.

Telecommunication carriers also offer two other services: the recording of a forwarding number; and provision of a disconnection message. For example, if a party changes its number and leaves a new forwarding number, a message is played when an incoming call is received notifying the calling party that the number has been changed. A disadvantage associated with this service is that the calling party must listen for and remember the new number, hang-up to terminate the original call, and dial the new number by initiating a separate call. Moreover, this feature is not available for a wireless/cellular user. As for when a telephone number has been disconnected, the calling party typically is notified of the disconnection but receives no additional information. A disadvantage associated with this feature is that the calling party must terminate the original call, determine from which geographical area to obtain directory assistance if it is a long distance call, contact directory assistance to obtain the new number, and dial the new number if one exists. Often times the new number is not within the original area code, for example when a party moves out of state, thereby making attempts to obtain directory assistance in the original area code region useless. Again, this feature is not available for a wireless/cellular user.

SUMMARY OF THE INVENTION

The present invention meets the needs and avoids the disadvantages and drawbacks of the above described telephone systems by providing a method for completing a telephone call originating from a calling party using a cellular network and received by a called party using either a cellular network or the plain old telephone system. If the telephone call originates from a first cell location to a called party at a non-wireless/cellular telephone number, the system compares the originating called number's time zone with the called party's time zone and outputs an announcement for the time of day at the called party's location if different from the calling party's time zone. If the telephone call originates from a first cell location to a called party at a second cell location, the system captures the originating time zone at the cell location, compares it to the time at the second cell location and outputs an announcement of the time of day at the called party's location if different from the calling party's time zone.

The system also provides a menu of options to the calling party during the telephone call. The menu options are announced to the calling party and a response is inputted by the calling party. A comparison is made between the inputted response and a set of valid responses. The options selected by the calling party are processed during the duration of the original telephone call.

DETAILED DESCRIPTION

Figure 1A:
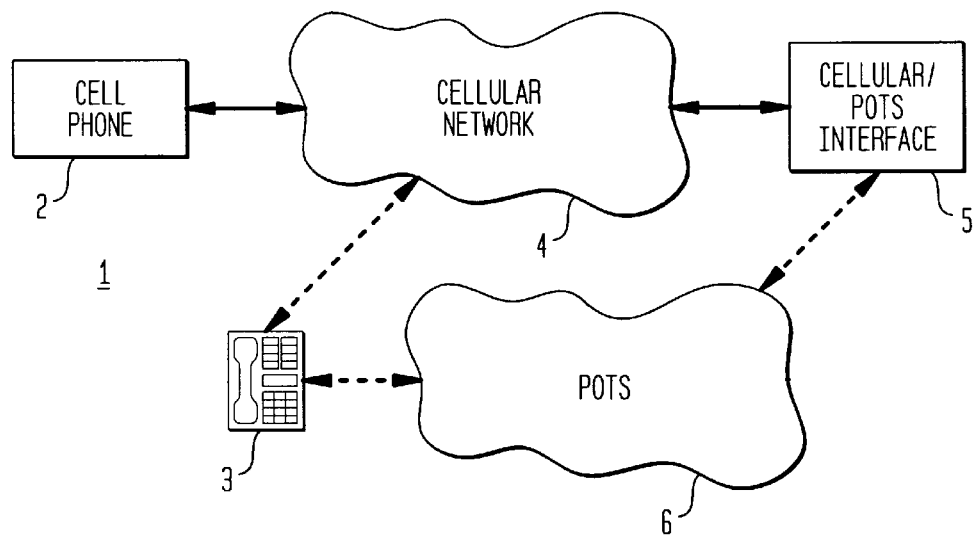
FIG. 1(a) is a simplified block diagram of a system in accordance with the present invention.

FIG. 1(a) is a simplified block diagram illustrating a system 1 in accordance with the present invention. A calling party using a cellular/wireless phone 2 places a telephone call to a called party 3. The called party 3 can be either a cellular phone or a phone connected to the POTS network. The telephone call is transmitted to a cellular/POTS interface 5 via cellular network 4 associated with a particular telecommunications carrier. The menu system according to the principles of the present invention can reside within the cellular network 4 or may be embedded in the POTS network 6. Alternatively, the system may also reside in an adjunct platform (not shown) that communicates with either the cellular network 4, cellular/POTS interface 5 and/or POTS network 6. When a telephone call is placed from the cellular phone 2 to a called party 3, the POTS network 6, for example, accesses the menu system. The system determines the time zone in the cellular location of the originating cellular/wireless phone 2. The system also determines the time zone of the called party phone 3 whether it is a cellular phone or a phone connected to the POTS network 6. The system compares the time zones associated with the called party 3 and the calling party 2. If the time zones are different, the system provides the calling party with an announcement associated with the time of day at the called party's location. The system also provides the calling party with a plurality of menu options as will be described in more detail below. The system can also be configured such that depending on what menu option is selected, the system accesses that particular function resident on a separate platform. The menu options are provided to the calling party on a real-time basis in that the calling party receives the options during the original call flow. The calling party is not required to terminate the original call and enter a series of numbers on their telephone keypad in order to initiate a particular telephone call feature as is required by prior systems. Moreover, the present system provides the calling party with a plurality of menu options for completing a call as opposed to subscribing to and initiating only one calling service at a time.

Figure 1B:
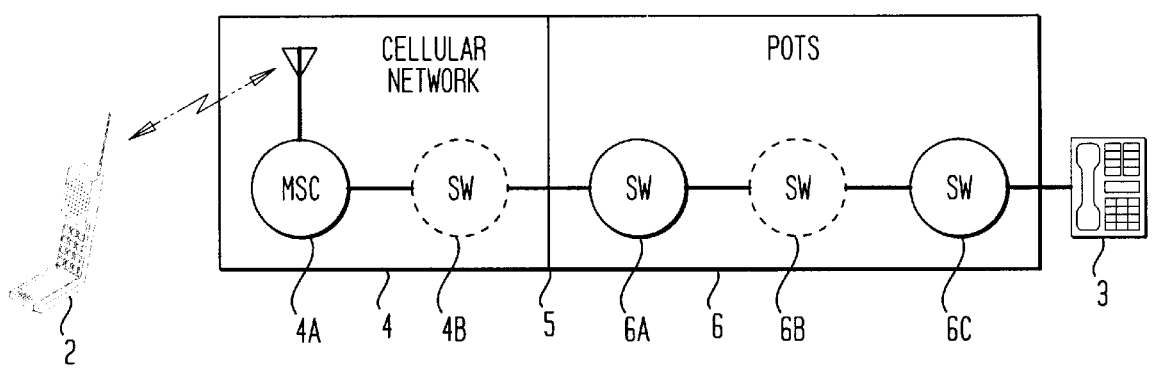
FIG. 1(b) illustrates a call path established in the system of FIG. 1(a).

A block diagram of a call path as established in by the networks of FIG. 1(a) is shown in FIG. 1(b). There, the cell phone 2 is provided in communication with an originating mobile switching center ("MSC") 4A. The call path may traverse other switches 4B (shown in phantom) within the cellular network until it reaches the interface 5 between the cellular and POTS networks. From the interface 5, the call path traverses a single or plural number of communication switches 6A–6C in the POTS network 6. The call path terminates at telephone 3.

Figure 2A:
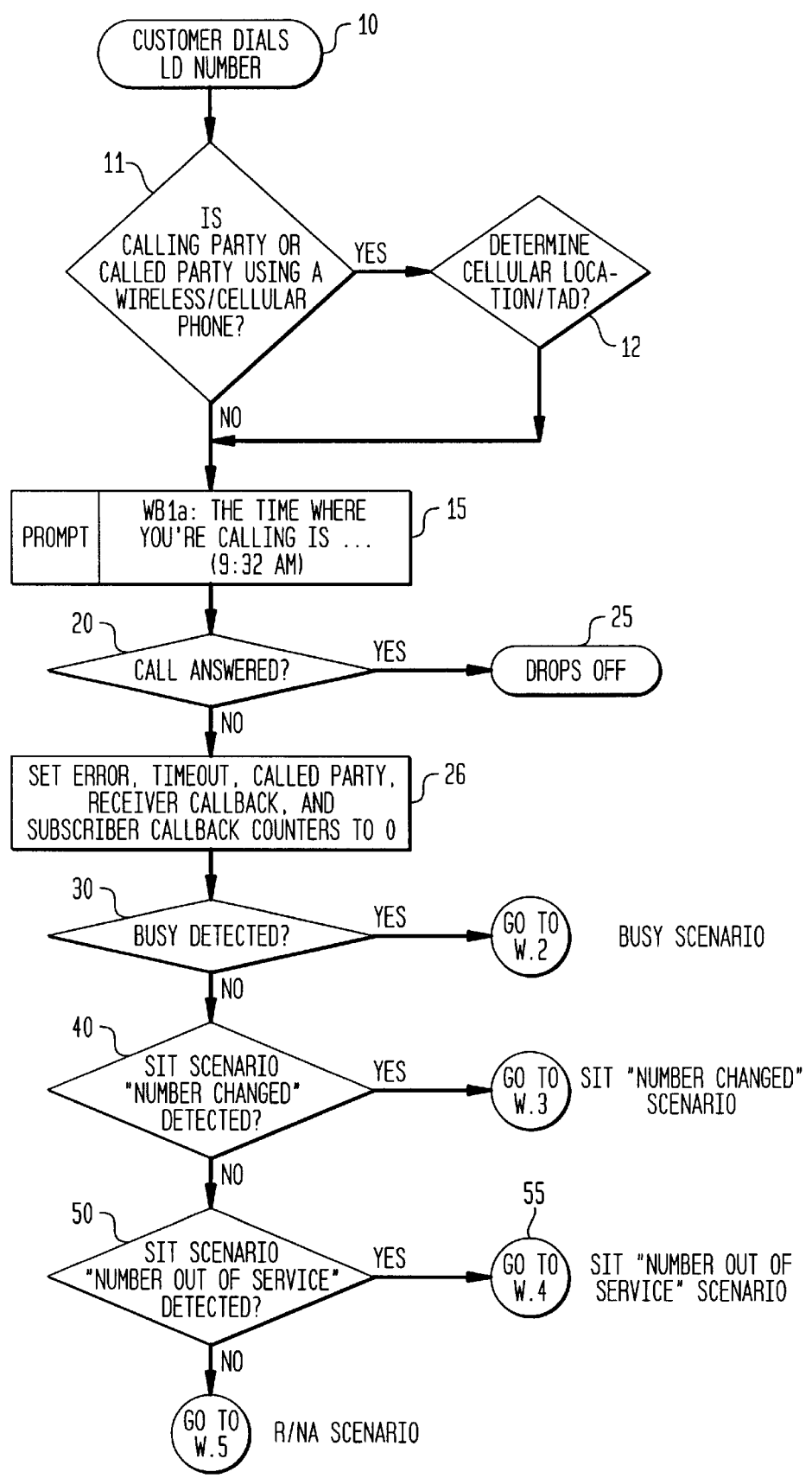
FIG. 2A is a flow chart of an exemplary process for completing a telephone call placed from a calling party's telephone to a called party's telephone as illustrated in FIG. 1(a).
Figure 2D:
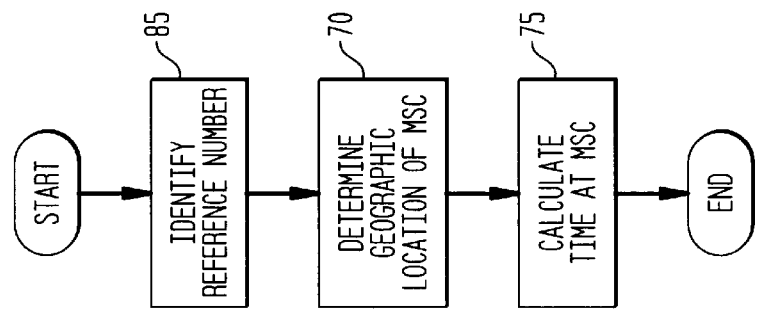
FIGS. 2B–2D are flow charts demonstrating the calculation of time for time of day announcements.
Figure 2C:
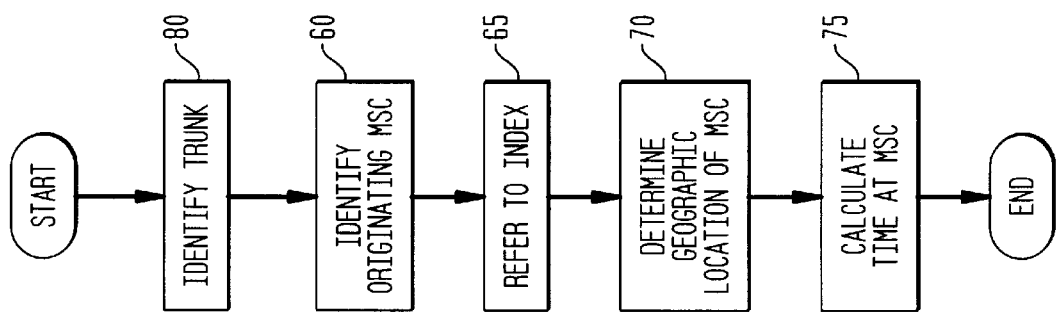

The following menu structure is a particular embodiment of implementing the present invention. However, different menus can be used without departing from the principles of the present invention. Turning now to FIG. 2A, the present invention is illustrated with reference to a general process flow of a telephone call from a calling party to a called party. The process begins in Step 10 when a calling party places a call to a called party by entering the called party's telephone number. A telecommunications carrier routes the call to the appropriate calling party as is known in the art. At step 11, the system determines if the calling party or the called party is using a wireless/cellular phone. If either party is using a wireless/cellular phone, the system continues processing, as described with reference to FIG. 2B, to determine the cell locations of the parties and provide a Time At Destination (TAD) announcement at step 12. Similarly, if the calling party and/or called party are not cellular users, the system determines the time at the called party's geographical location, compares it to the time at the calling party's area and if different, announces the time at the called party's location to the calling party at step 15. Alternatively, the system can also detect if a call is not being placed across different time zones and suppresses the current time prompt.

Figure 3:
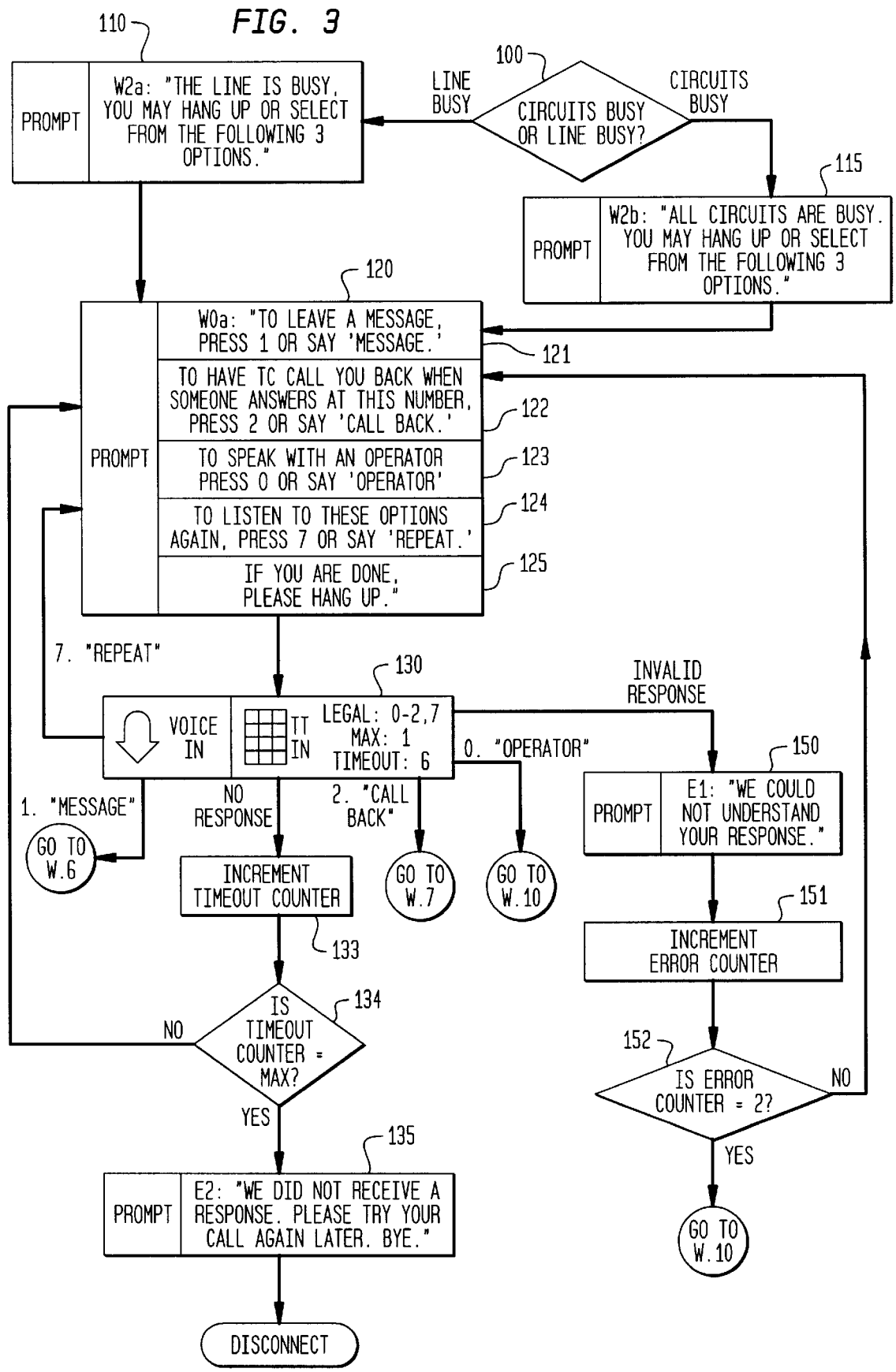
FIG. 3 is a flow chart illustrating a subprocess related to the process of FIG. 2A for completing a telephone call when a busy signal is received.

At step 20, the system determines if the call has been answered by the called party in which case the process is terminated at step 25. At step 26, the system resets various counters within the system as will be described in detail below. If the call is not answered by the called party, the process detects why that telephone call has not been completed and provides the calling party with several options within the original call flow. In step 30, the process determines whether a busy signal exists at the called party's telephone at which point the busy scenario of subprocess W.2, described with reference to FIG. 3, is provided to the calling party. If a busy signal is not detected the system determines at step 40 whether or not the called party's number has been changed. If the number has been changed, the process continues to the number changed scenario at subprocess W.3 described with reference to FIG. 4. If the number of the called party has not been changed, the process continues and detects whether the called party's telephone number is out of service at step 50. If the called party's telephone number is out of service, a notification to that effect is provided to the called party at step 55. If the number of the called party is not out of service the process continues to subprocess W.5, described with reference to FIG. 6, where the system detects if a ring-no answer condition exists at the called party. If the call is answered by the called party prior to the announcement prompt in step 15, the announcement is interrupted and the connection is completed.

The present invention establishes the time of day at the cellular calling party according to one of three modes of operation. The mode of operation is predetermined within the POTS 6.

Figure 2B:
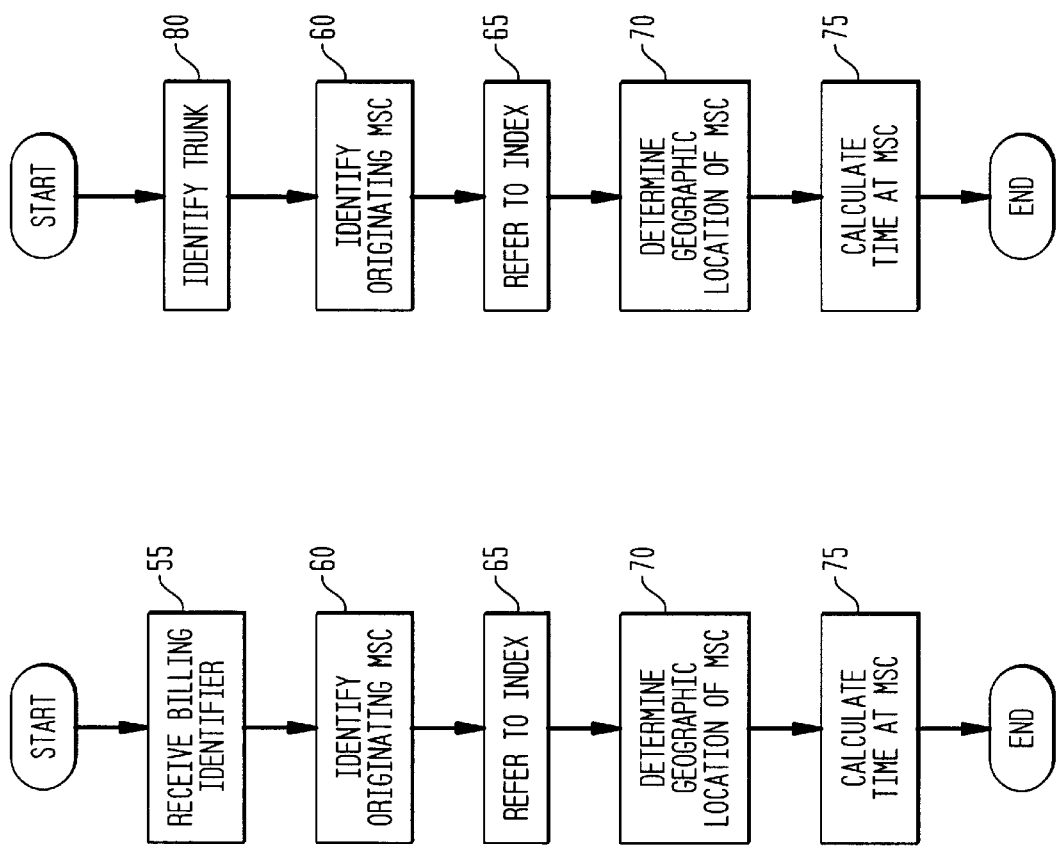

Shown in FIG. 2B, the first mode may be used when the POTS 6 bills the cellular network 4 for the long distance calls of its customers. The cellular network 4 and the POTS 6 exchange call setup information that includes a billing identifier designating the originating MSC 4A (and, therefore, the cellular network) as the party to be billed.

To identify the geographic location of the cellular phone 2 in this first mode, the system receives the billing identifier and identifies the MSC 4A (Steps 55 and 60). The system refers to an index of switches (Step 65) to identify the geographic location of the originating MSC 4A (Step 70). For example, in the United States, the system may refer to the well-known North American Numbering Plan that uniquely identifies an address of every switch in North America, both traditional land-line switches and mobile switching centers. Once the geographic location of the MSC 4A is determined, the system determines the time zone of the MSC 4A and calculates the time of day at that location (Step 75).

In a second mode, the POTS 6 may provide a direct connection between itself and the originating MSC 4A. In this instance, switch 4B is omitted from the call path of FIG. 1(b). For example the POTS 6 may be connected to the MSC 4A by an optical or electrical cable, such as a T1 trunk line. In this case, all traffic received by the POTS 6 over the cable will have originated from the originating MSC 4A. The system may associate the trunk with the an address identifying the MSC 4A (Step 80). Once the MSC 4A is identified, the system identifies the MSC, refers to the index of switches, and calculates the time according to Steps 60–75.

In a third mode, the POTS 6 bills the calling party directly for long distance services. According to a well-known communications convention, the POTS 6 may charge the calling party different rates depending on the distance of the call path that the calling party is trying to establish. In accordance with the convention, the cellular network 4 provides a reference number to permit the POTS 6 to rate the call. The reference number, for example, may identify the originating MSC 4A. Armed with the reference number, the system identifies the geographic origin of the call and calculates the time at the origin (Steps 85, 70, and 75).

Turning now to FIG. 3 which explains subprocess W.2 referenced in FIG. 2A when a called party's line is busy. If the called party's line is busy, the calling party receives a prompt to that effect and is asked to select from the following options. Typically there are two types of causes for receiving a busy signal: the called party may be on another call, or the circuits connecting the two parties may be overloaded with call traffic. If the call is not connected because all circuits between the calling party and the called party are busy, a prompt, in step 115, is recited to the calling party to the effect that the circuits are busy and they may select from options listed in step 120. For example, in step 120 the calling party receives the following five menu options when either a line busy prompt or an all circuits busy prompt are received: "to leave a message, press 1 or say 'message'" at step 121; "to have the telecommunications carrier ("TC" as shown in step 122) call you back when someone answers at this number, press 2 or say 'call back'" at step 122; "to speak with an operator, press 0 or say 'operator'" at step 123; "to listen to these options again, press 7 or say 'repeat'" at step 124; and at step 125 "if you're done, please hang up." The specific menu options, the order of the specific menu options, and the numbers pressed in order to initiate a particular menu option are provided herein for example purposes only. Alternative menu options can also be employed without departing from the principles and spirit of the invention. To select a menu option the party may either press the number corresponding to the desired option on their numbered telephone keypad or they may say the spoken equivalent of the number to accommodate rotary phones. The system recognizes either the touch tone entry or a user's spoken word.

At step 130 a determination is made whether or not a particular selection made by the calling party matches one of the menu prompts listed in step 120. For example, if the calling party selects the numbers 0, 1, 2, or 7, the process determines that these selections are acceptable and will proceed with responding to the function associated with the selection made. Alternatively, if the calling party responds to the prompts in step 120 verbally, the acceptable responses include, for example, "message", "callback", "operator", and "repeat."

If a response to prompt 124 is detected and received at step 130 the menu prompts included in step 120 are repeated. If the calling party elects to leave a message for the called party, the call complete process continues to subprocess W.6 described in more detail with reference to FIG. 6. If, in step 130, a response from the calling party to the prompts in step 120 is not detected, the system begins a time-out subprocess which begins at step 133. A comparison is made at step 134 between the number of time-outs which have previously occurred and a predetermined maximum. The calling party receives a prompt in step 135 to the effect that a response was not received and that the calling party should try the call again later and the telephone call is disconnected at step 136. If the counter in step 134 has not reached the predetermined maximum number, the calling party selects one of the prompts in step 120 and the process continues. If the option associated with step 122 is selected by the calling party by pressing the number 2 on the telephone keypad or by the spoken phrase "call back," the process continues to subprocess W.7 illustrated and described with reference to FIG. 12. If the calling party selects option 123 by pressing 0 or saying "operator" the process continues to subprocess W.10 illustrated and described with reference to FIG. 23. If none of the options received at step 130 are valid options, in that they are not associated with the options listed in step 120, the process continues to step 150 where the calling party receives a prompt to the effect that the system could not understand the response given. An error counter subprocess begins at step 151 and counts the number of times an invalid response was received in response to the menu prompts listed in step 120 and compares this number to a predetermined maximum at step 152. If the number of invalid responses exceeds the predetermined value the process is forwarded to an operator at subprocess W.10. If the number of invalid responses at step 152 has not reached the predetermined maximum, the party is forwarded back to step 120.

Figure 4:
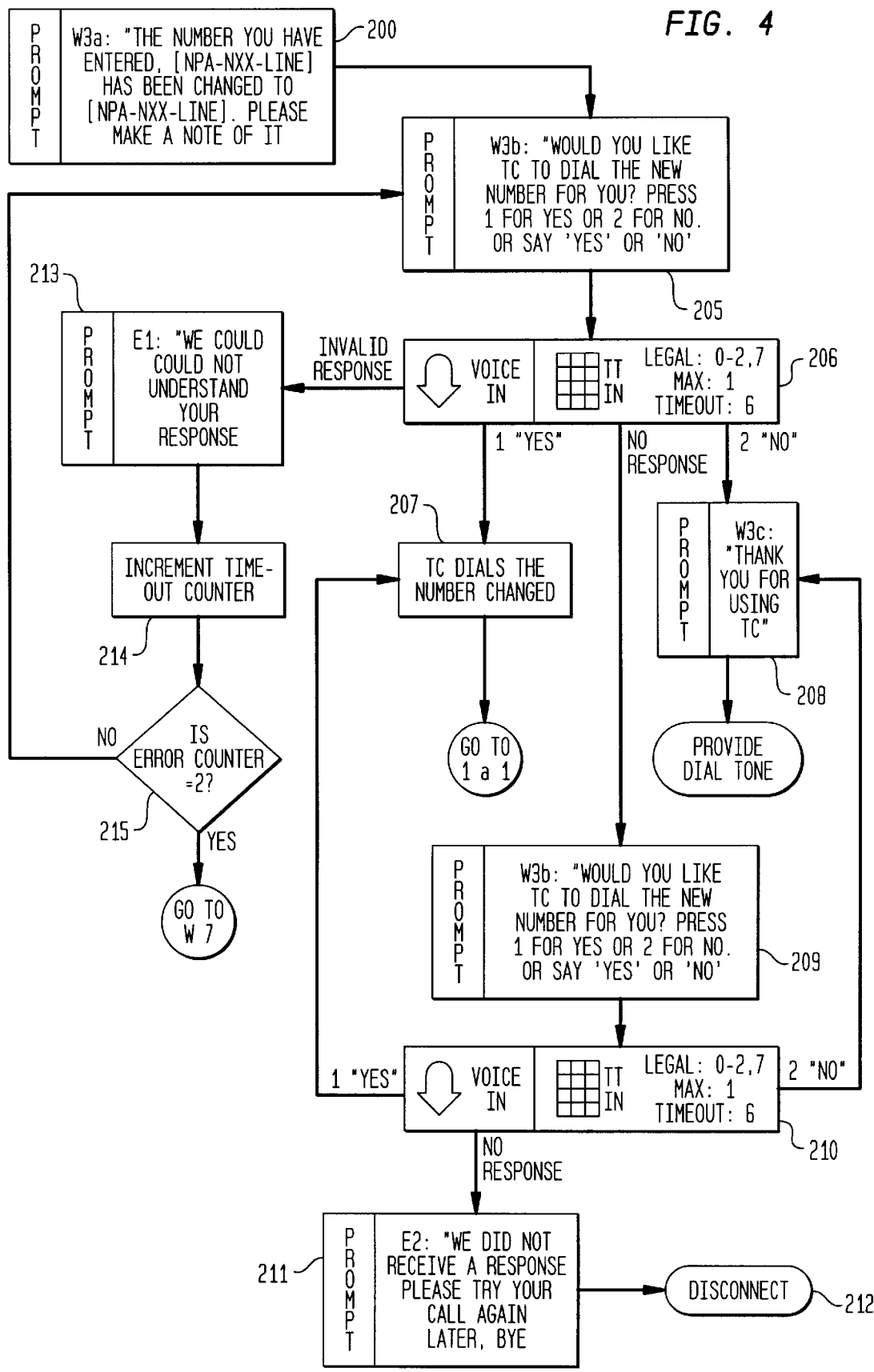
FIG. 4 is a flow chart illustrating a subprocess related to the process of FIG. 2A or completing a telephone call when the called party's telephone number has been changed.

Turning now to FIG. 4, subprocess W.3 referenced in FIG. 2 is illustrated where the calling party receives an announcement at step 200 that the telephone number of the called party has been changed. At step 205 the calling party is presented with the option to have the system dial the new number. Unlike prior telephone service systems where the calling party would have to remember the new number received at step 200, hang-up to terminate the original call, and dial the new number for the called party, the system in accordance with present invention provides the calling party with the option to have the new telephone number dialed real-time—that is during the current call flow. At step 205, the calling party is also asked if they do not want the telecommunications carrier to dial the new number for them.

At step 206, the system receives the calling party's response either by pressing the number corresponding to the menu option on their telephone keypad or by voice activation by saying "yes" or "no" in response to the prompt at step 205. If the calling party responds to prompt 205 by having the telecommunications carrier dial the changed number at step 207, the calling party receives the telecommunications carrier's associated message tone at step 1.a.1 in FIG. 2 and the call continues as previously described. If the calling party elects not to have the telecommunications carrier dial the number for them, the system forwards the calling party to step 208 where a prompt is received providing the calling party with a dial tone to begin the calling party's next call. If no response is received to step 206 the system again prompts the calling party if they would like the number dialed for them at step 209. If the answer received at step 210 is a "yes" or the touch tone number 1, the process is forwarded to step 207 where the new number is dialed by the telecommunications carrier. If the response to step 209 is a "2" or a spoken "no," the process is forwarded to step 208. If there is no response again, a prompt is provided to the calling party at step 211 notifying the calling party that a response was not received and disconnects the call at step 212. If a response to step 205 is not a valid response, a prompt at step 213 is provided to the calling party notifying them that the response was not valid. An incremental error counter at step 214 begins and a comparison at step 215 determines whether or not the number of invalid responses is allowable. If the number of error responses is within a predetermined maximum amount the process is forwarded to step 205. If the invalid response counter is equal to the predetermined maximum error count, the calling party is forwarded to an operator at subprocess W.10.

Figure 5:
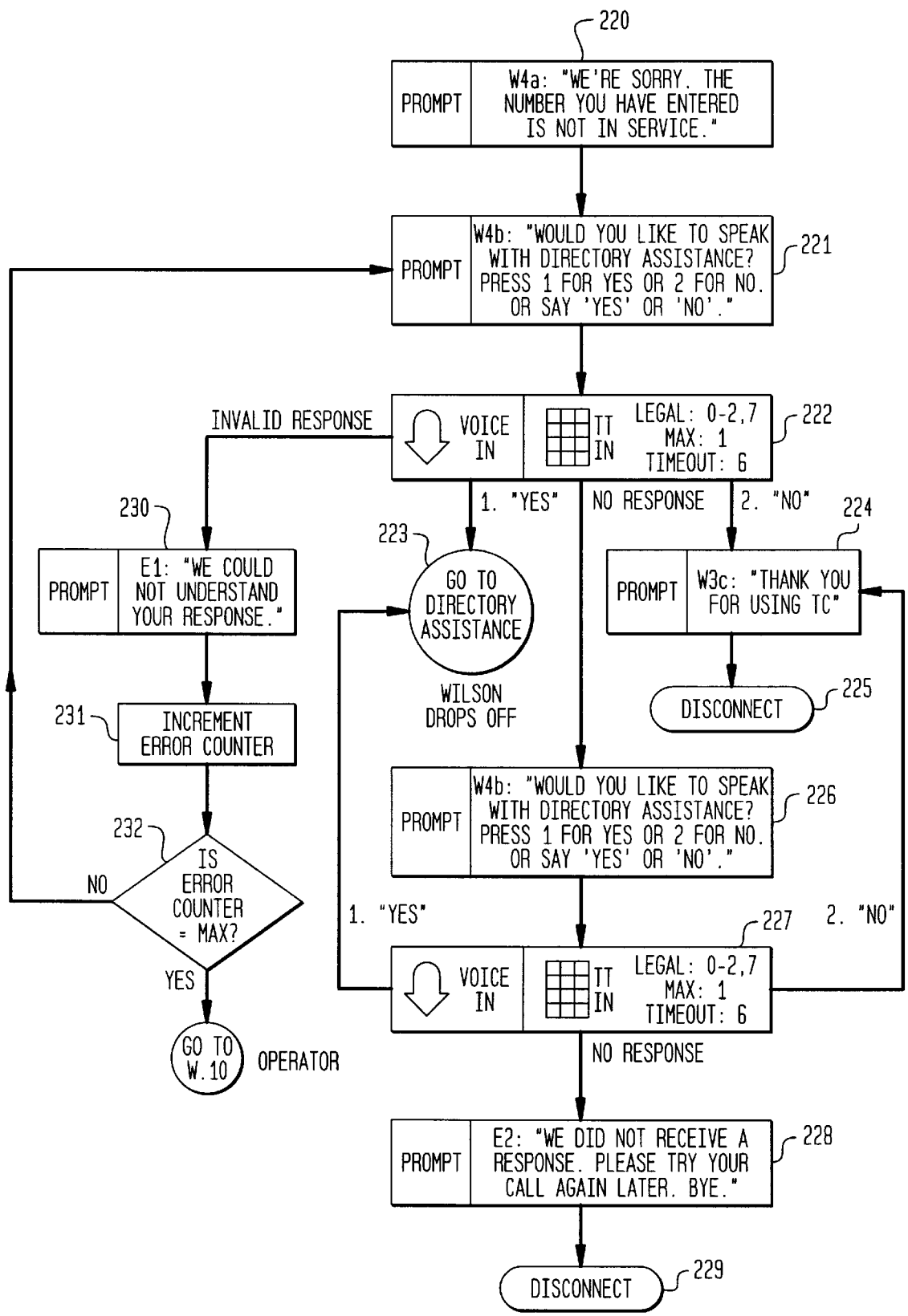
FIG. 5 is a flow chart illustrating a subprocess related to the process of FIG. 2A for completing a telephone call when the called party's telephone number is out of service.

FIG. 5 illustrates subprocess W.4 where the calling party receives a prompt at step 220 which advises the calling party that the number they have dialed is not in service. At step 221 the call complete process provides a prompt to the calling party to determine whether or not the calling party would like directory assistance. Unlike prior systems, the call complete process in accordance with the present invention provides directory assistance during the present call flow, whereas existing telephone services required a calling party to first terminate the original call and contact directory assistance via a separate telephone call. If the calling party selects 1 or says "yes" at step 221, the process analyzes the input at step 222 and forwards the calling party to telecommunications carrier directory assistance at step 223. If the response received at step 222 is either a 2 or a "no", whereby the calling party does not want directory assistance, the calling party receives a telecommunications carrier prompt and the call is disconnected at step 225. If no response is received at step 222, the calling party is again prompted at step 226 whether or not they would like directory assistance. The response to prompt 226 is received and processed at step 227. If the calling party elects to receive directory assistance the process is forwarded to step 223. If the calling party elects not to receive directory assistance the process is forwarded to step 224. If no response is received at step 227 the calling party receives a prompt at step 228 notifying them that the call will be disconnected at step 229.

Figure 6:
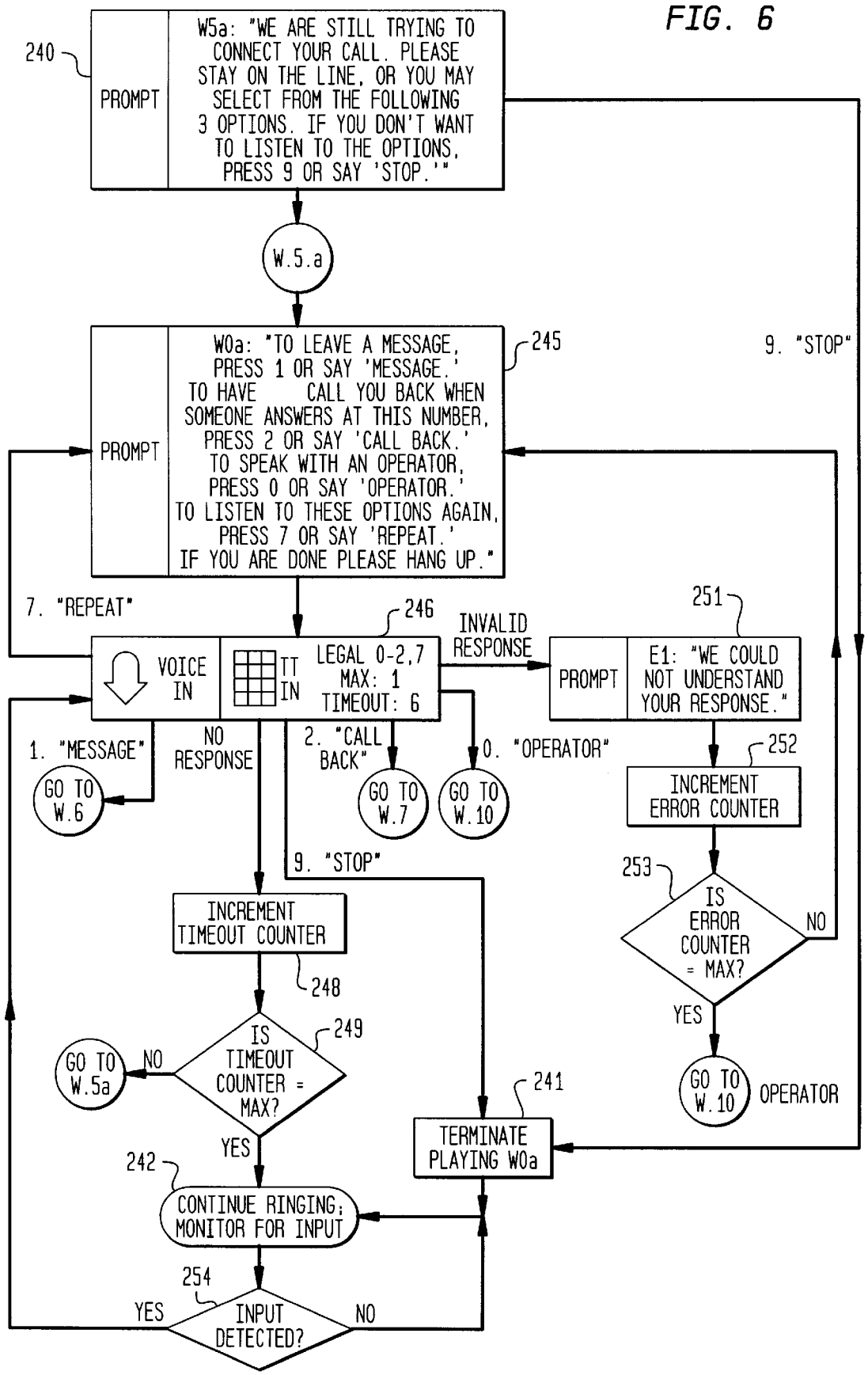
FIG. 6 is a flow chart illustrating a subprocess related to the process of FIG. 2A for completing a telephone call when the calling party receives a ring no answer at the called party's telephone number.

If a response, received at step 222 is an invalid response, the calling party receives a prompt at step 230 notifying them that the response could not be understood. Again, an incremental error counter is initiated at step 231 and the number of invalid responses received is compared with a predetermined maximum at step 232. If the error counter is equal to the predetermined maximum the process is forwarded to subprocess W.10. If the error count is less than the predetermined value, the process returns to step 221. FIG. 6 illustrates subprocess W.5 of FIG. 2 where a ring-no answer scenario is received by the calling party. After a predetermined number of rings where the called party has not answered, the calling party receives a prompt at step 240 which notifies the calling party that the telecommunications carrier is still trying to connect the call and to stay on the line or they may elect to choose from the following three options. At step 240 the calling party is also prompted with the option of not listening to the following options and to press 9 or say "stop" which forwards the calling party to step 241. This selection terminates the option prompts at step 240 and continues ringing the called party at step 242. The options provided to the calling party at step 245 can be, for example, leaving a message, having the long distance carrier call the calling party back when someone answers at the called party's number, speaking with a telecommunications carrier operator, listening to these options again or hanging up. The options at step 245 allow the calling party to complete the telephone call.

The system, at step 246, analyzes the response received from the called party with respect to the menu options provided at step 245. If the calling party elects to leave a message by pressing 1 or saying "message," the call complete process forwards the calling party to step 247. If no response is received, an increment counter at step 248 is initiated. At step 249, a comparison is made to determine whether the time-out counter is equal to a predetermined maximum. If the time-out counter at step 249 is equal to the predetermined number the system continues ringing the called party at step 242. If the counter is not equal to the predetermined number the process is forward to step W.5.a. If the response received at step 246 is the number 9 or the spoken term "stop" the menu prompt at step 245 is terminated at step 241 and the system recognizes if ringing proceeds at step 242. If ringing does proceed, the system monitors if an input is detected at step 254.

If the response received at step 246 is the number 2 or voice response "call back," the process continues at subprocess W.7. If the calling party responds to the prompts in step 245 with a keypad entry of 0 or by saying "operator," the system continues to subprocess W.10. If the response received at step 246 is an invalid response the calling party receives a prompt at step 251 notifying the calling party that the response could not be understood. Again, an error subprocess defined by steps 242 and 253 determines if the number of errors is equal to a predetermined maximum. If the error count is equal to the predetermined value the process is forwarded to subprocess W.10 where the calling party is connected to an operator. If the error count at step 253 is not equal to the predetermined maximum, the calling party returns to step 245. If an input from the calling party is detected at step 254, the calling party is forwarded to step 246 to determine the next step in response to the input received.

FIGS. 7–11 refer to subprocess W.6 and illustrate the steps when the calling party elects to leave a message for the called party as referenced at steps 245 in FIG. 5 or step 122 in FIG. 2. At step 260 the system determines whether or not the calling party is a subscriber to the telecommunications carrier messaging service. Subscriber information can be stored in a database and accessed in a manner known in the art. If the calling party is not a subscriber, the calling party is forwarded to step 261 where the calling party may select a messaging service different from their primary telecommunications carrier. If the calling party selects the messaging platform of their primary telecommunications carrier, the process continues to step 262. If the calling party selects an alternative messaging service, the process proceeds to step 261. A prompt at step 265 is provided to the calling party and, at step 266, a determination is made whether or not there are technical problems associated with the messaging service. This acts as a verification that the system is functioning and the calling party can leave a message. If technical problems do exist the calling party is forwarded to process W.6f.1 which will be described in more detail with reference to FIG. 12. The system may also be configured to calculate the cost for leaving a message. This would allow telecommunications carriers to offer the service to both subscribers and non-subscribers.

At step 268, a prompt is announced to the calling party that requests a person's name to which the message will be delivered. The system in accordance with the present invention provides an option for the calling party to deliver the message to a specific person. In prior messaging systems the message was delivered to whomever, at the calling party's telephone, picked up the phone. The person's name is recorded at step 269. If there are technical problems associated with recording the person's name at step 270 a prompt is provided through a time-out process at step 271 notifying the calling party that a response to the prompt at step 268 was not recorded. At step 272, the system determines whether or not the error response in step 271 was the first time the message was played. If yes, then the calling party is asked again to say the person's name to whom the message will be delivered at step 273 and the person's name is recorded at step 269. If the error prompt at step 272 was played more than once, the process is forwarded to subprocess W.6f.2 as described with reference to FIG. 12. At step 275 the calling party is prompted as to whether or not they would like to restrict delivery of the message recorded to only the specific person recorded in step 269. This further ensures that the message is left for the proper party. The response to prompt 275 is analyzed in step 276.

If the response to prompt 275 is 1, indicating that the calling party would like to restrict delivery of the message to only one person, the process is forwarded to subprocess W.6b described with reference to FIG. 8. If the response to prompt 275 is invalid as analyzed at step 276, the prompt at step 277 is announced to the calling party notifying the calling party that the response was not understood. If the response to prompt 275 is an invalid response entered for the first time as determined at step 278, the calling party is returned to the prompt at step 275. If it is determined at step 278 that this is not the first time that the error response was provided to the calling party the process is forwarded to subprocess W.6b as described with reference to FIG. 8.

Figure 7:
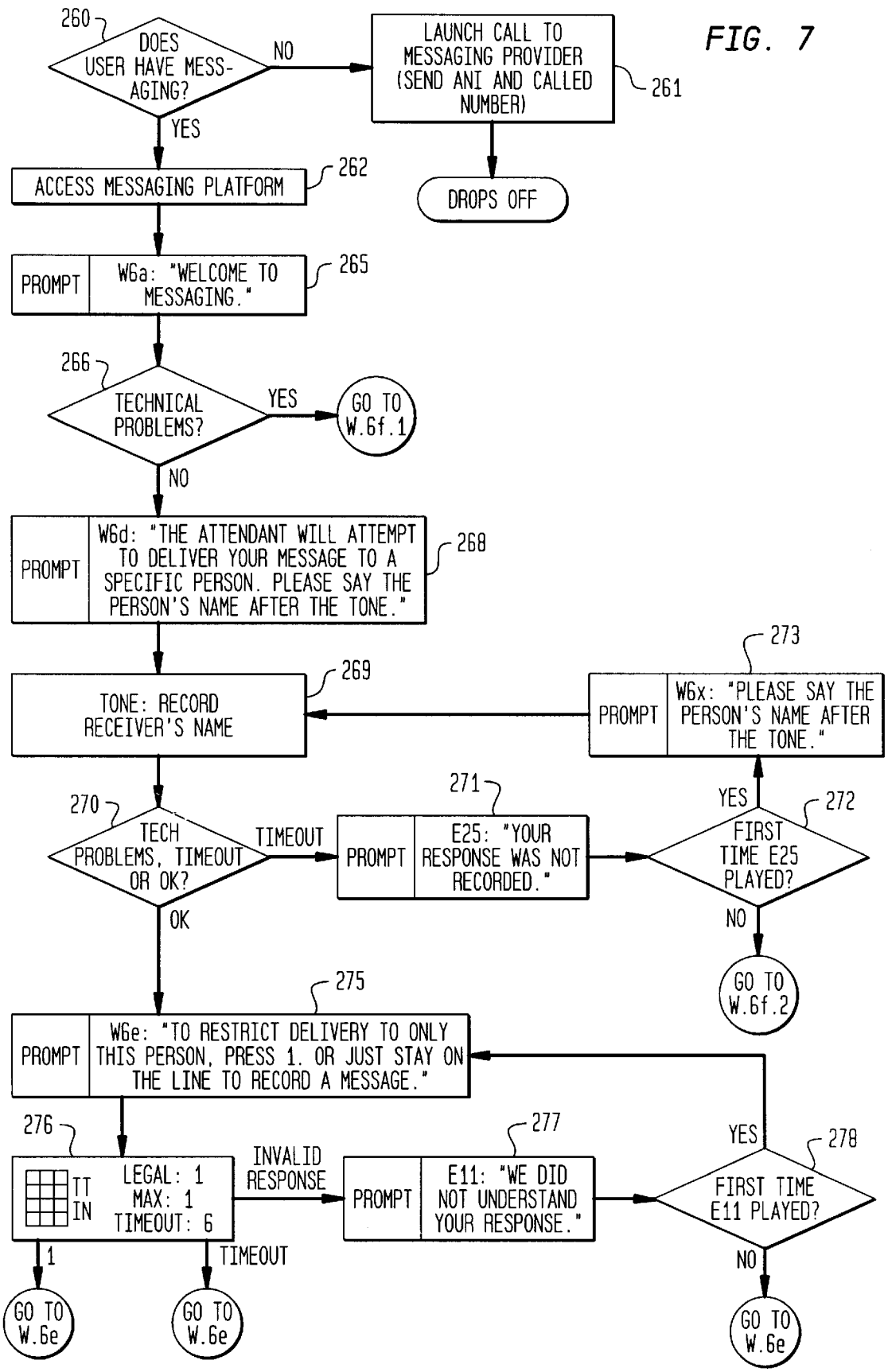
FIG. 7 is a flow chart illustrating a subprocess for leaving a message for the called party.
Figure 8:
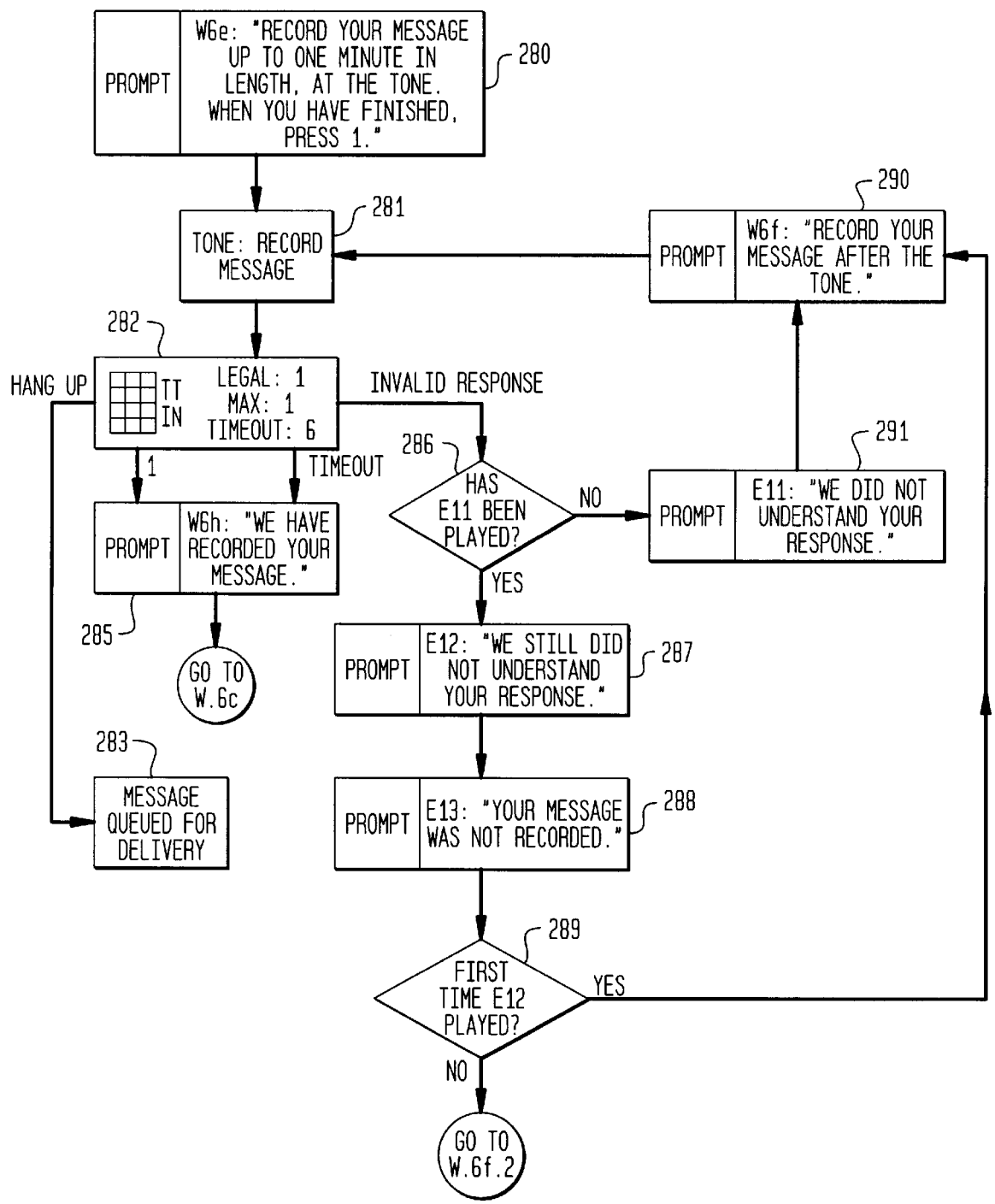
FIG. 8 is a subprocess related to the process of FIG. 7.

FIG. 8 illustrates the flow of subprocess W.6b for recording a message from steps 276 and 278 in FIG. 7. If the calling party elected to record a message for the called party and the calling party received the prompt at step 275, the calling party receives an additional prompt at step 280 asking the calling party to record the message up to 1 minute in length after a tone is played. Additionally, the prompt may also include a request that the calling party, when finished with recording the message, press the number 1 on their telephone to end the message. At step 281 a tone is provided to the calling party and the message is recorded and stored for later playback. At step 282, the process detects whether or not the calling party has hung up the phone and queues the message for delivery at step 283.

If the calling party, after recording the message, presses 1, the prompt at step 285 notifies the calling party that the message has been recorded and the process continues to subprocess W.6c. If after the message is recorded an invalid response is detected at step 282, an error message is played at step 286 notifying the calling party that the system did not understand the response. Step 286 determines if the error message has been played. If it has not been played an additional prompt at step 287 again tells the calling party that the received response was not understood and the message was not recorded at step 288. If this was the first time the error message at step 287 was played the process returns to step 290 and a prompt is provided to the calling party to record the message after the tone is received. If at step 289 the error message from step 287 was not played for the first time, the process continues to subprocess W.6f.2. If after an invalid response is detected at step 282, step 286 determines that the error message was not played, a prompt at step 291 is provided notifying the calling party that the system did not understand the response given. The process is then forwarded to step 290 for recordation of the calling party's message.

Figure 9:
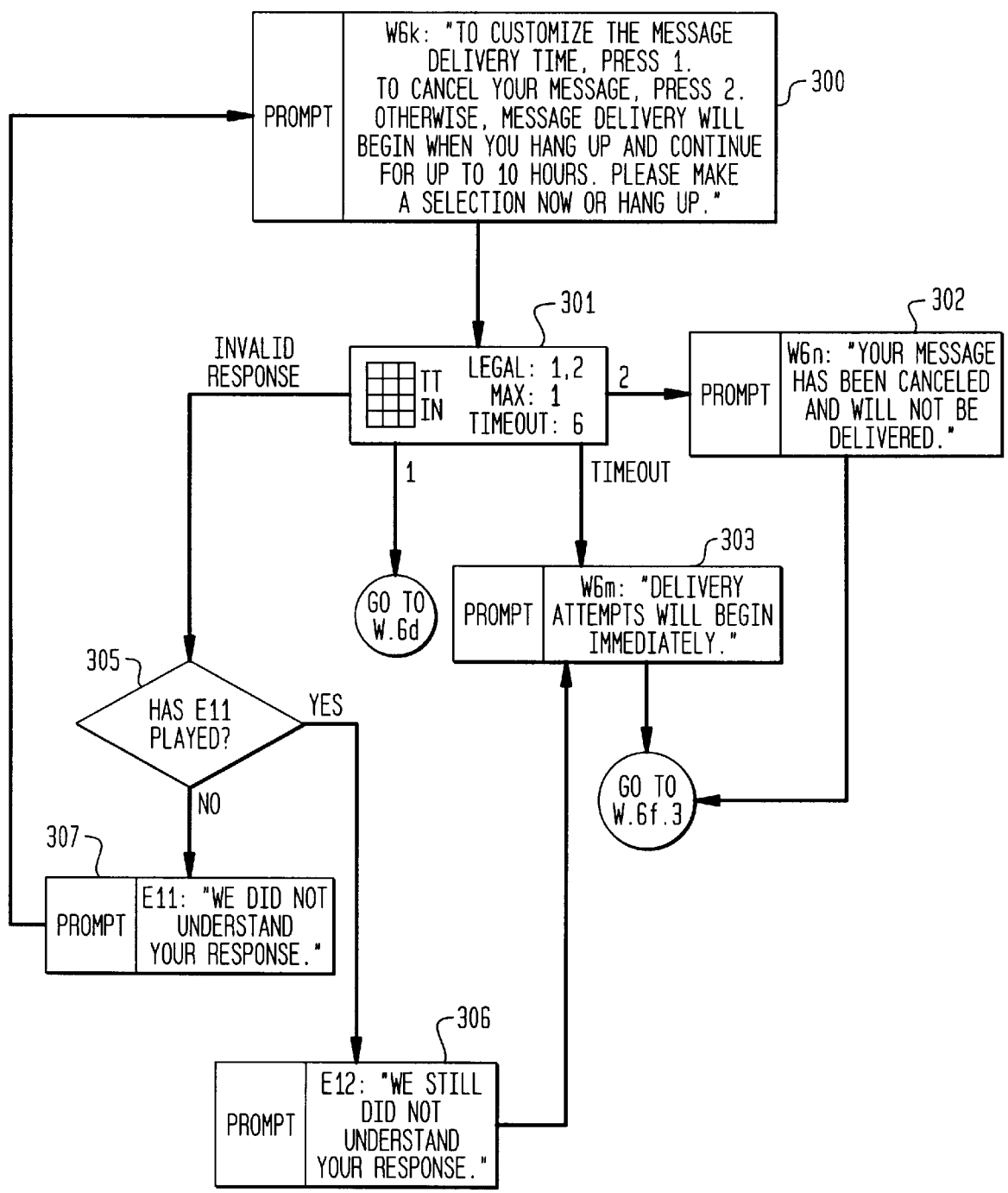
FIG. 9 is a subprocess related to the process of FIG. 8.

Subprocess W.6c of the call messaging function is outlined in FIG. 9. The calling party has the ability to customize the recorded message at step 300. A prompt is provided to the calling party to customize the message delivery time or to cancel the message, otherwise message delivery begins when the calling party hangs up and continues for a period of time. The amount of time the message delivery will proceed is arbitrary for example, 10 hours, and may be customized. Step 301 analyzes the responses received from step 300. If the calling party wishes to customize the message delivery time and presses a 1, the process is forwarded to subprocess W.6d as described with reference to FIG. 10. If the calling party enters the number 2 to cancel the message which is detected at step 301, a prompt is provided at step 302 notifying the calling party that the message has been canceled and will not be delivered. The process is then forwarded to subprocess W.6f.3 as described with reference to FIG. 12. If the calling party does not enter one of the valid options in response to the prompts in step 300 and a predetermined period of time has expired, a time-out will occur and the prompt from step 303 notifying the calling party that delivery attempts of the message will begin immediately is provided. Once the prompt in step 303 has been played for the calling party the process continues to subprocess W.6f.3. If the response received in step 301 is a 1 noting that the message delivery will be customized, the process continues to subprocess W.6d as described with reference to FIG. 10. If an invalid response is received at step 301 an error count is processed at step 305 and error message at step 307 is announced. If this error message was not announced, the system prompts the user at step 307 that the response received was not understood and the process returns to step 300.

Figure 10:
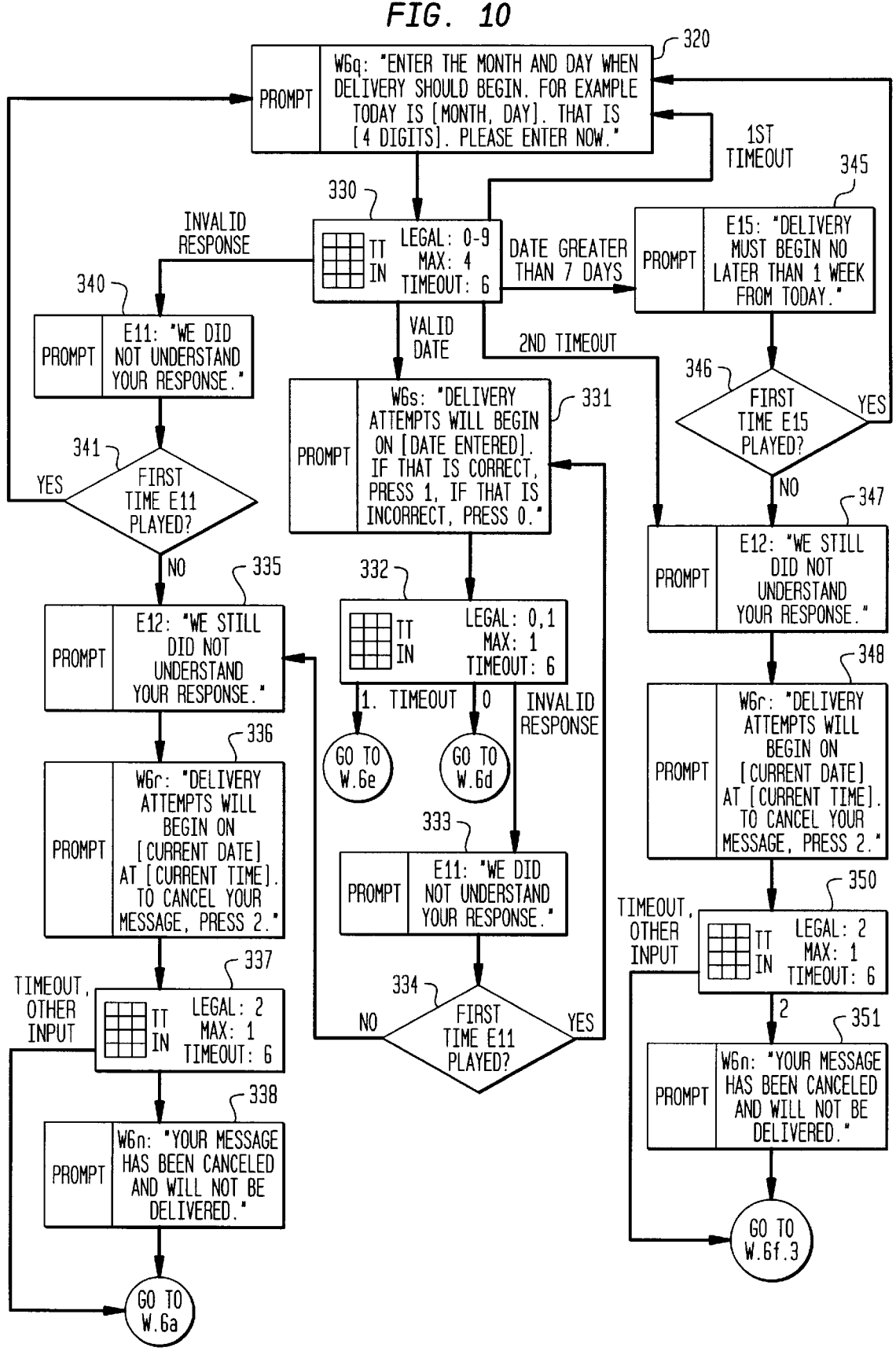
FIG. 10 is a subprocess related to the process of FIG. 9.

Subprocess W.6d is illustrated with reference to FIG. 10, where, at step 320, a prompt requests the calling party to enter the month and day when delivery of the message recorded at step 281 should begin. FIG. 10 illustrates additional customization parameters which can be programmed into the message feature of the present invention. Step 330 processes the response received from the calling party to the prompt in step 320 and determines the validity or invalidity of that response. The date entered by the calling party is analyzed at step 331 to determine when delivery of the message will begin. Step 332 receives and processes the response received from step 331 and determines whether or not the response is valid. If the response is a "0" the process returns to step 320 of subprocess W.6d. If the response is a "1" the process continues to subprocess W.6e described with reference to FIG. 11.

If the response detected in step 332 is an invalid response, a prompt at step 333 is provided to the calling party stating that an error has been received and that the system did not understand the response. Similar to the previous error detection processes the system determines at step 334 if the prompt in step 333 is being played for the first time, if so, the process returns to step 331. If it is not the first time the error message has been played the process continues to step 335 where the calling party receives additional error response. After the prompt in step 335 is provided to the calling party a prompt at step 336 is recited stating that delivery attempts will begin on the current date and current time received in step 330. In step 337, the response to prompt 336 is analyzed. If the response received is the number 2, the message is canceled, a prompt is provided to the calling party at step 338 and the call is forwarded to subprocess W.6a as described with reference to FIG. 7.

Returning now to step 330, if the response received to prompt 320 is an invalid response the system proceeds to step 340 where the error message is played for the calling party. The number of times the error message is played is determined at step 341. If it is the first time the error message has been played the process returns to step 320. If it is not the first time the error message has been played the process proceeds to step 335. In step 330, if the date entered in response to the prompt in step 320 is greater than 7 days from the current date, the process continues to step 345 where the calling party is notified that delivery of the message can begin no later than 1 week from the current date. At step 346, a determination is made whether or not the prompt from step 345 has been played to the calling party for the first time. If the determination is "yes," the process returns to step 320. If the determination is "no," a prompt is provided to the calling party at step 347 notifying the calling party that the system still did not understand the response. At step 348 the calling party receives an additional prompt that the message delivery attempt will begin on the current date and at the current time as received at step 330. At step 350, the process analyzes the input received in response to the prompt at step 348. If the response is the number "2" a prompt is provided to the user at step 351 that the message has been canceled and will not be delivered and the process continues to subprocess W.6f.3 as described with reference to FIG. 12. If at step 350 the system does not receive a response to the prompt in step 348 within a predetermined time period the process continues to subprocess W.6f.3.

Figure 11:
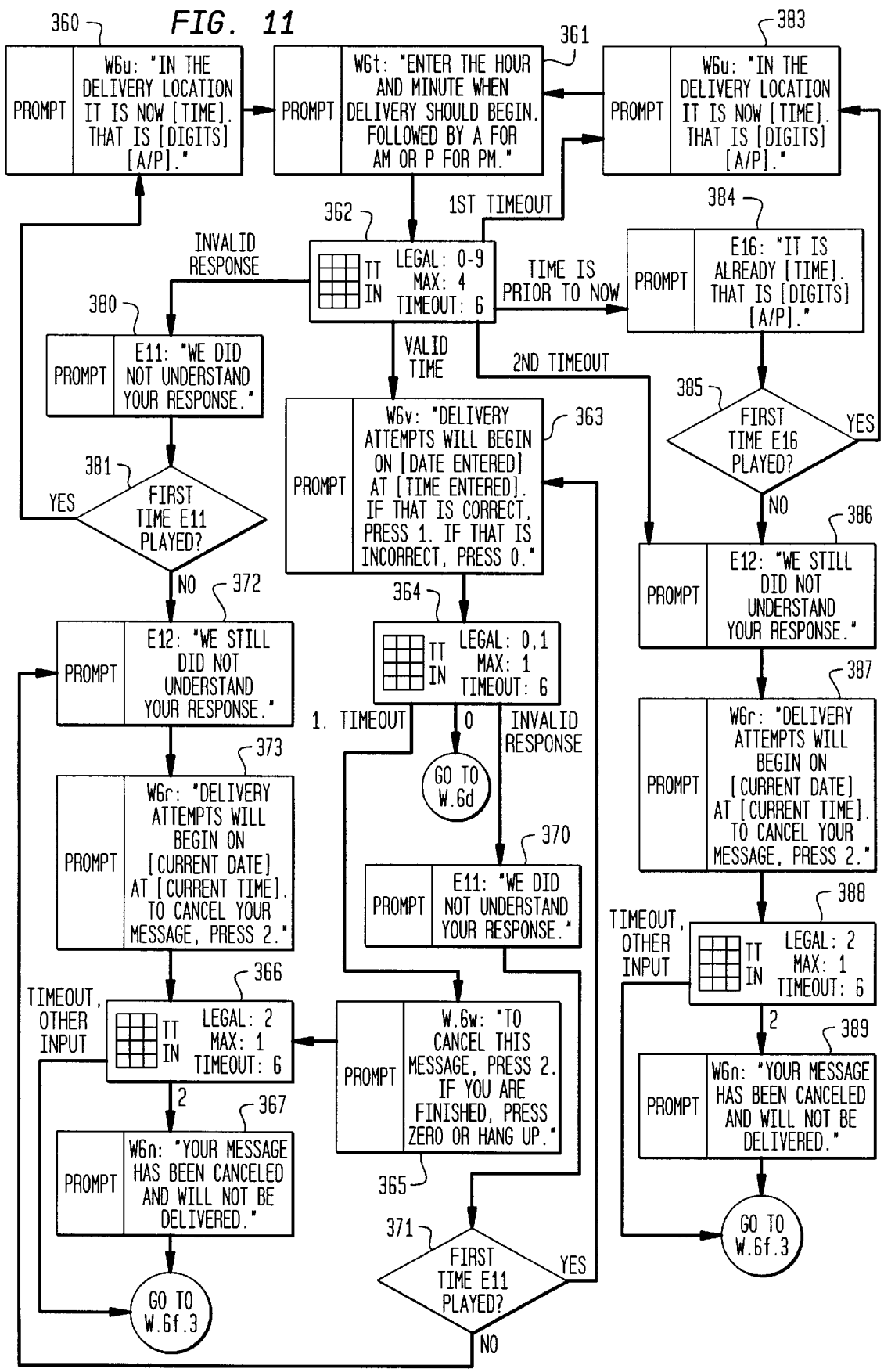
FIG. 11 is a subprocess related to the process of FIG. 10.

FIG. 11 illustrates subprocess W.6e which interacts with step 332 of FIG. 10 for customization of message delivery. First, the calling party receives a prompt at step 360 notifying the calling party of the time, in the location of the called party, the message will be delivered. The calling party is then prompted in step 361 to enter the hour and minute when delivery of the message should begin. The calling party's response to the prompt at step 361 is analyzed at step 362. If a valid time has been entered, the process continues to step 363 where a prompt is provided to the calling party that delivery attempts will begin on the date entered and at the time entered. The calling party is also asked to verify that the date and time entry is correct. The response to prompt 363 is evaluated at step 364. If the input at step 364 is a "1" confirming that the date and time entered in step 361 is correct, the calling party is asked whether or not they want to cancel the message or, if they are finished with this function, to press "0" or hang up. The response to step 365 is evaluated at step 366. If the number received at step 366 is a "2", a prompt at step 367 is provided to the calling party notifying the calling party that the message has been canceled and the process is forwarded to subprocess W.6f.3 described with reference to FIG. 12. If the input received at step 364 is a "0" or the spoken equivalent, the process is forwarded to subprocess W.6d.

If the response received at step 364 is an invalid response, an error message is provided to the calling party at step 370 notifying the calling party that the system did not understand the response. Again, a determination at step 371 evaluates whether or not the error message at step 370 has been played for the first time, the process returns to step 363. If the error message has been played previously, the process continues to step 372. At step 373 the calling party is prompted that message delivery attempts will begin on the current date and time. Alternatively, the calling party can also cancel message delivery by pressing, for example, the number "2" on their telephone keypad. The calling party's input is analyzed at step 366, where the entry to the prompt at step 363 is forwarded to step 367. If a response to the prompt in step 373 is not received at step 366 within a predetermined amount of time, a time-out occurs and the process continues to subprocess W.6f.3.

Returning to step 362 where the response to the prompt in step 361 is analyzed, if a response is invalid the process continues to step 380 where an error message is provided to the calling party. At step 381 a determination is made whether or not the error message in step 380 has already been played. If it has already been played the process proceeds to step 372. If the prompt in step 380 has been played for the first time, the process is forwarded to step 350.

Returning again to step 362, if a response to the prompt in step 361 has not been received within a predetermined period of time, the process continues to step 383 where the calling party is notified of the time and the location in which they are calling. If the time entered in response to the prompt in step 361, which is evaluated at step 362, is prior to the current time, the prompt at step 384 is provided to the calling party notifying them that the time entered in response to step 361 is invalid. A determination is made at step 385 whether the error message in step 384 has already been played. If the error message has been played, the process returns to step 383. If the error message in step 384 has been played more than once, the process proceeds to step 386 where a prompt is announced to the calling party that the system did not understand the response. The process continues to step 387 where the calling party is notified that message delivery attempts will begin at the current date and time. At step 387, the calling party is provided the option to cancel the message for example, by pressing the number "2" on their telephone keypad. The response received from step 387 is analyzed at step 388 to determine if the response is valid. If the calling party cancels the message, the process proceeds to step 389 and continues to subprocess W.6f.3. If no input, time-out message, or other invalid response is received at step 388, the process is forwarded to subprocess W.6f.3. If the calling party does not provide a response for a second time, the process is forwarded to step 386.

Figure 12:
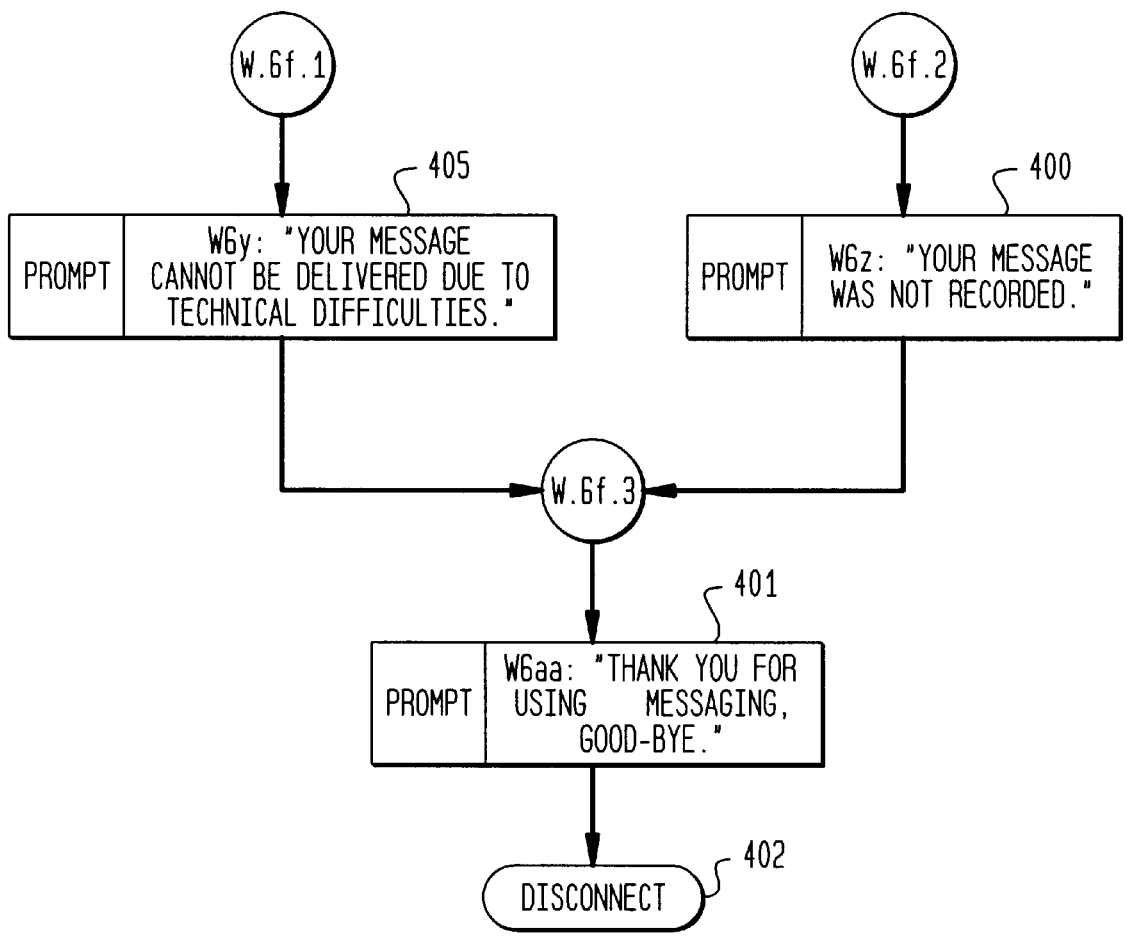
FIG. 12 is a subprocess related to the process of FIGS. 7–11.

FIG. 12 illustrates subprocess W.6f where, at step 400, a prompt is received by the calling party notifying them that the message was not recorded and is forwarded to subprocess W.6f.3 where an announcement is provided to the calling party at step 401 and the call is disconnected at step 402. An additional prompt notifies the calling party that the call will be disconnected at step 402. At step 405 the calling party is notified that the message cannot be delivered due to technical difficulties and the process is forwarded to subprocess W.6f.3.

FIGS. 13–17 describe the process flow for the callback option described with reference to step 122 in FIG. 3. First the system determines, at step 420, whether or not the calling party has access to the callback option. If the calling party does not have callback access, the process is forwarded to step 421. If the calling party does have access to the callback feature the process continues to step 425 where a determination is made whether the calling party has already left a callback request for the called party. If a callback request has already been received and processed, a prompt at step 430 is provided to the calling party which reminds them that a callback request to this particular called party's number has already been processed. Step 430 also asks the calling party whether or not they wish to cancel that request.

The response received from the calling party to the prompt at step 430 is analyzed at step 431. If an invalid response is received the process continues to step 484 and the calling party is notified that the system could not understand the response. An increment counter is set at step 435. At step 436 a determination is made whether the error count is equal to a predetermined number. If the error counter is equal to this value then the process continues to subprocess W.10. If the error count is less than this value, the process returns to step 431. If no response is received at step 431 with respect to the prompt provided the calling party in step 430, an increment time-out counter is set at step 440. A determination is made at step 441 to determine if the time-out counter is equal to a predetermined value similar to the increment counter described above. If the time-out counter is equal to the predetermined value, the process continues at step 442 where a prompt is provided to the calling party that the system did not receive a response and the telephone call is disconnected at step 443. If the time-out counter is not equal to the predetermined value the process returns to step 441.

If, at step 431 the number 2 or a spoken "no" response is received, the system provides the prompt in step 444 and continues to subprocess W.7.a.1. If, at step 431 the number 1 or the spoken "yes" response is received, the system announces the prompt at step 445 and the process continues to subprocess W.7.a.1 described with reference to FIG. 14.

Figure 13:
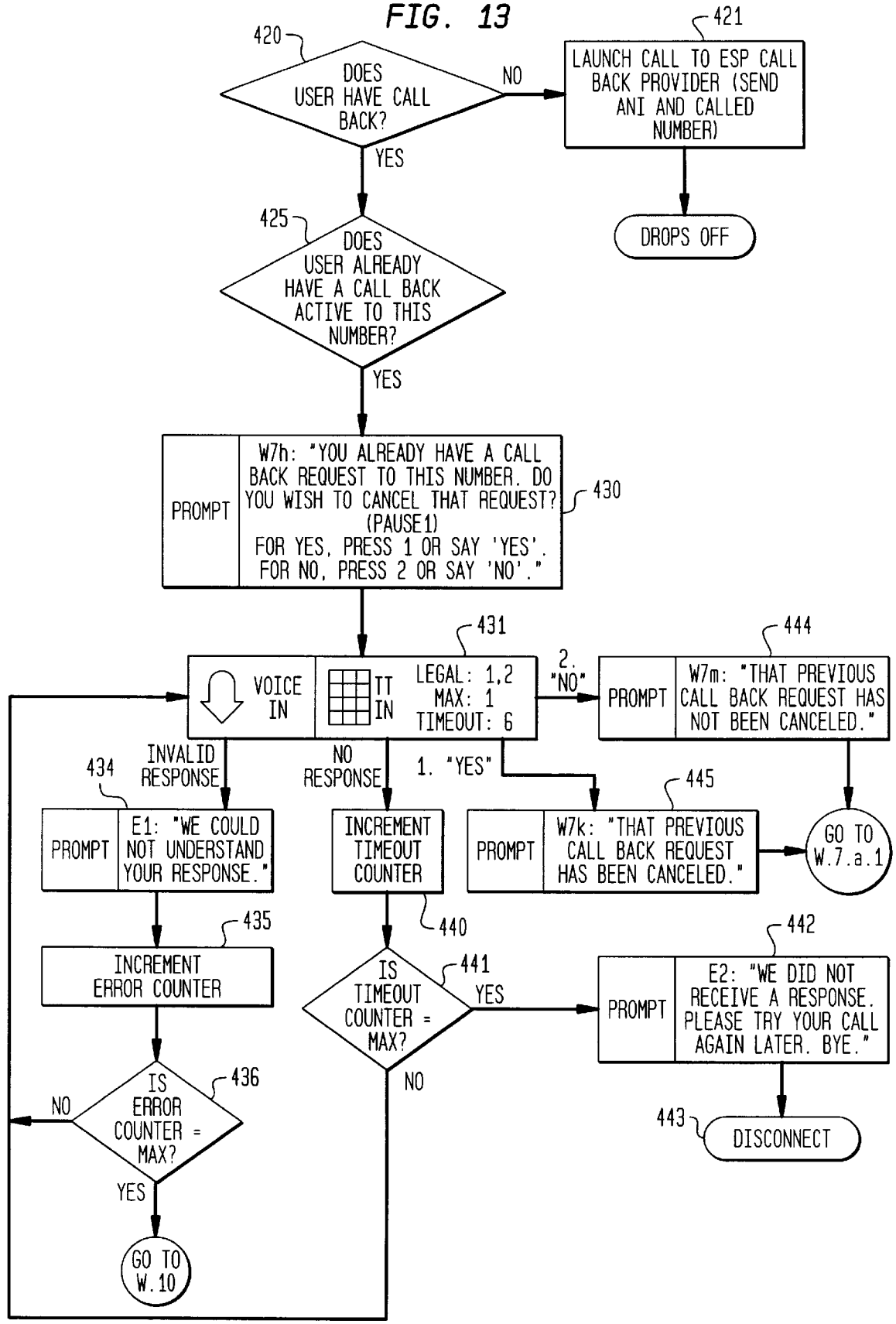
FIG. 13 is a flow chart illustrating subprocess corresponding to the call back feature referenced in FIG. 3 in accordance with the present invention.
Figure 14:
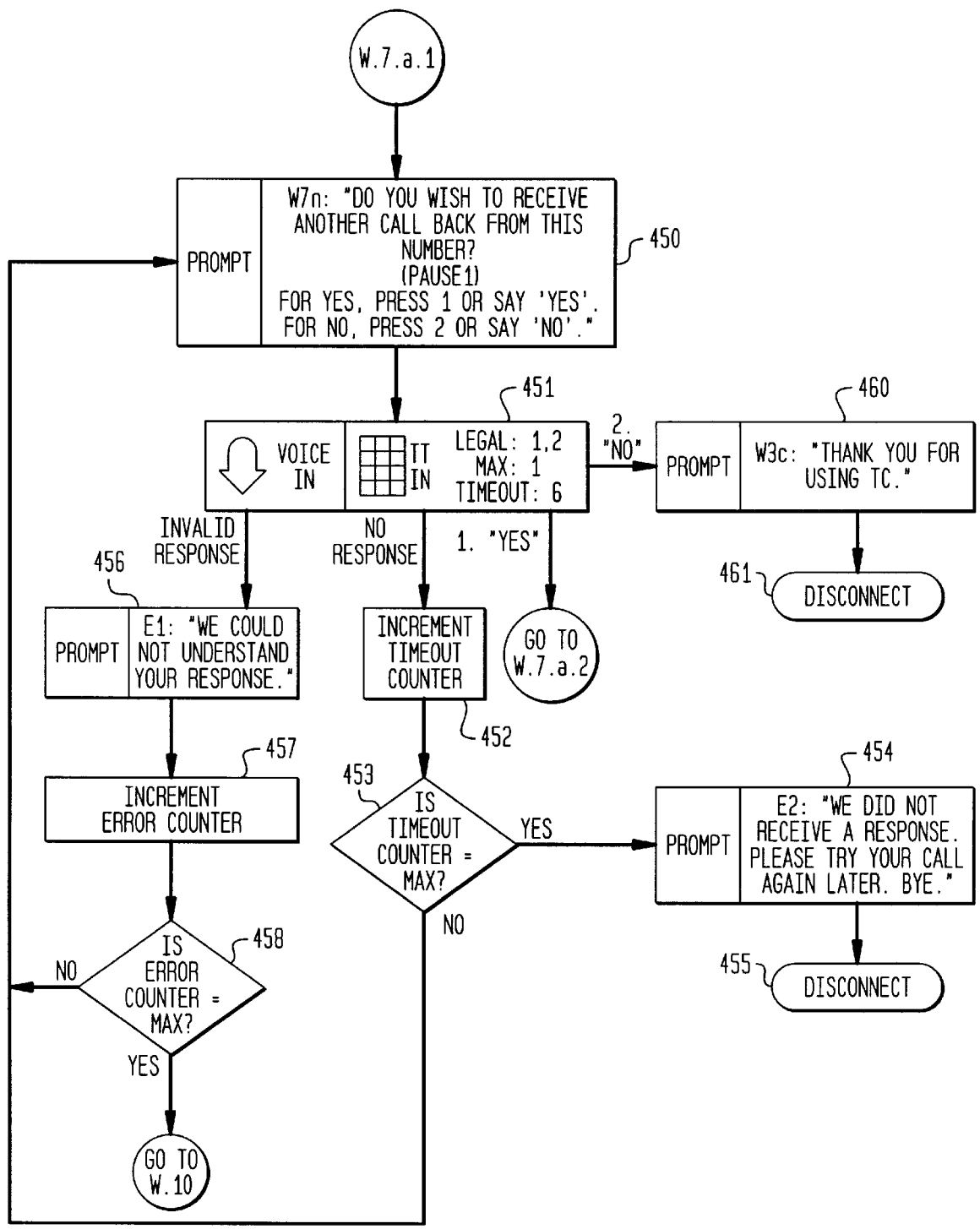
FIG. 14 is a subprocess related to the process of FIG. 13.

Turning now to FIG. 14 which is a continuation of the callback process at FIG. 13, the calling party is asked, at step 450, whether they wish to receive another callback from the calling party. The response is analyzed at step 451, where if no response is detected, an increment counter at step 452 and step 453 proceeds as described earlier with respect to steps 440, 441, 442, and 443. If step 451 receives an invalid response the process continues to step 456, 457 and 458 similar the function of steps 434, 435, and 436 described with reference to FIG. 13. If the response received in step 451 is a valid response, for example, the number "1" or the spoken word "yes", the process continues to subprocess W.7a.2. If the response received at step 451 is, for example, the number "2" or the spoken work "no," the process continues to step 461 and the telephone call is disconnected.

Figure 15:
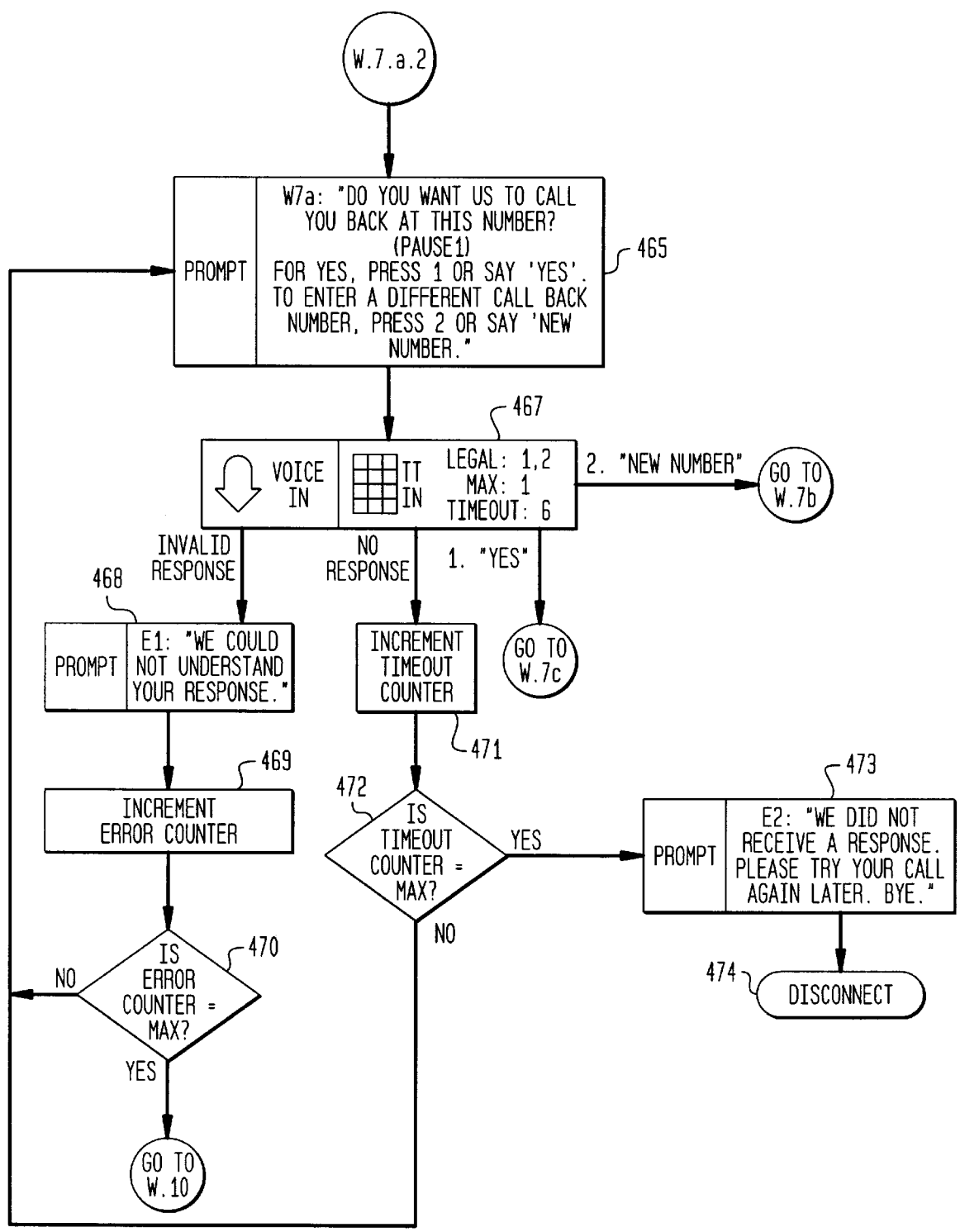
FIG. 15 is a subprocess related to the process of FIG. 14.

Turning now to FIG. 15 which describes subprocess W.7.a.2 referenced in FIG. 14, where a calling party can request a call back to a different number. The calling party is asked at step 465, whether the callback feature should be received at the called party's present number. The calling party's response is analyzed at step 467 where an invalid response is processed at steps 468, 469 and 470 similar to steps 456, 457 and 458 described with reference to FIG. 14. Additionally, if no response is received at step 467 increment time-out counter at step 471, 472, 473 and 474 is processed similar to steps 440, 441, 442, and 443 as referenced in FIG. 13. If a valid response is received at step 467, for example the number "2" which may correspond to a request to call back the calling party at a new number, the process continues to subprocess W.7.d. If the response received at step 467, for example, is a "1" indicating that the callback should be performed at the calling party's present number the process continues to subprocess W.7c as described with reference to FIG. 17.

Figure 16:
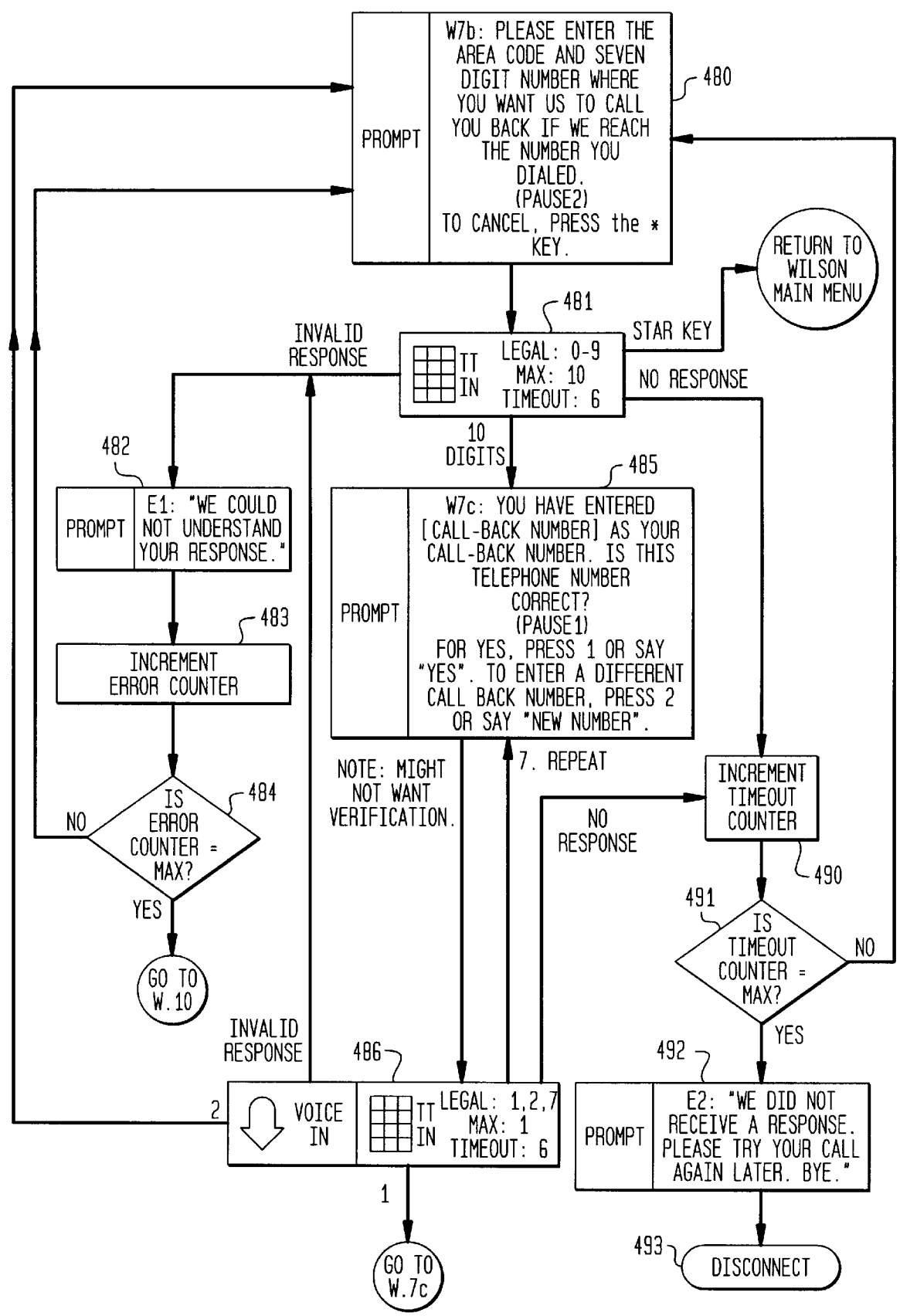
FIG. 16 is a flow chart illustrating a subprocess for entering a telephone number for receiving a call back.

Turning now to FIG. 16, which describes the process for entering a different call back number, the process requests the calling party at step 480, to enter the area code and 7-digit number of the new number. The response from the calling party is analyzed at step 481. If an invalid response is inputted the process continues to steps 482, 483, and 484 similar to steps 434, 435 and 436 described with reference to FIG. 13. If step 481 determines that an area code and 7-digit phone number has been entered, the process continues to step 485 where the callback number is verified. If the callback number is correct, the calling party enters a validation response, for example, by pressing "1" or saying "yes". If the number entered in step 480 is incorrect, the calling party enters a different number, for example the number "2", or says "new number". The response is analyzed at step 486. If an invalid response is received, the process continues to step 482, 483 and 484 as described above. If no-response is received, the process is forwarded to steps 490, 491, 492, and 493 which functions similarly to steps 440, 441, 442 and 443 described earlier with reference to FIG. 13. If the callback number has been entered and verified at step 485 and 486 the process continues to subprocess W.7.c as described with reference to FIG. 17. If a repeat request is received at step 486, the prompt at step 485 is repeated. If different number request is received, for example, by entering the number 2, the process returns to step 480 for entry of the area code and seven digit number.

Figure 17:
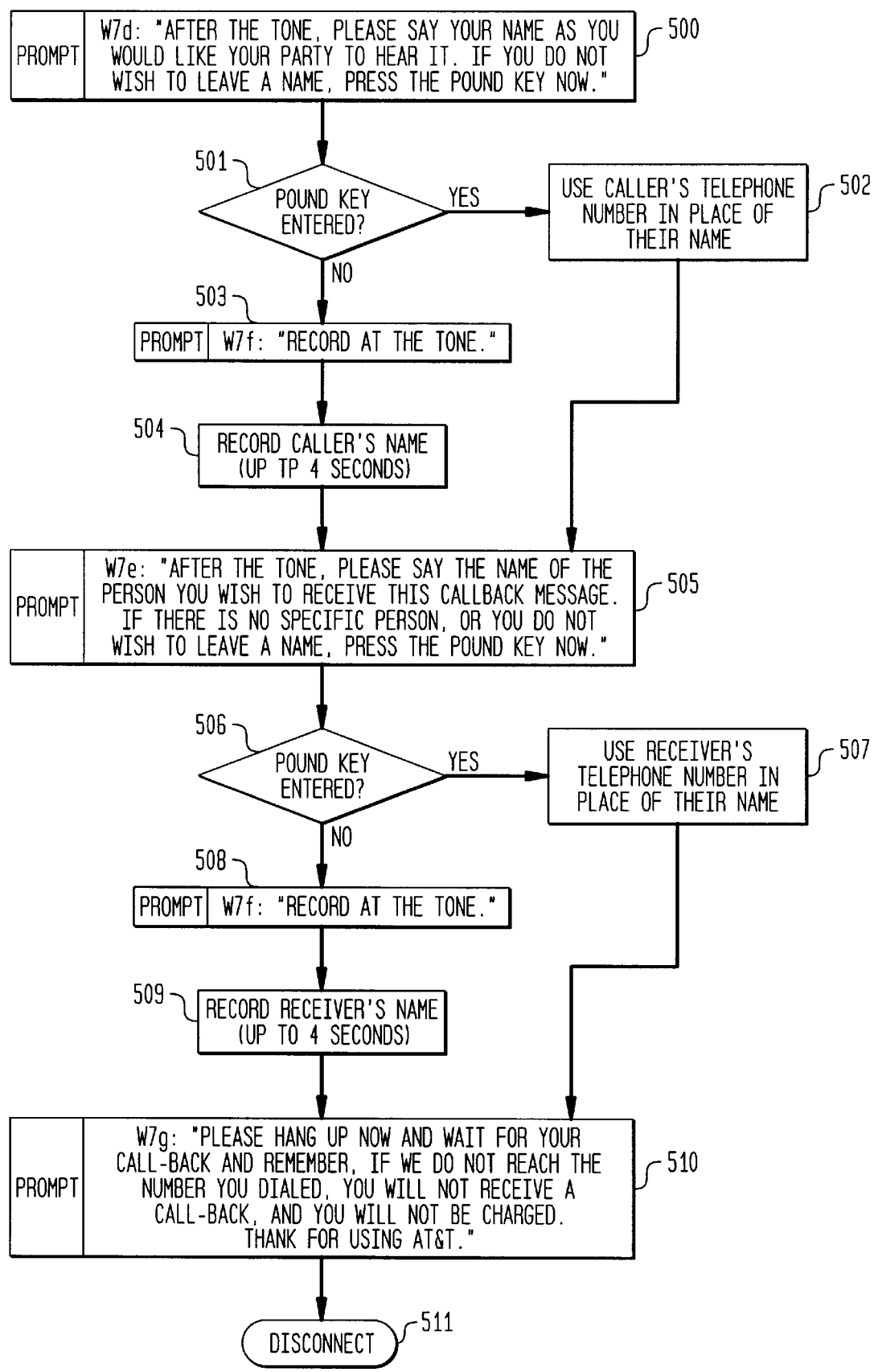
FIG. 17 is a subprocess related to the process of FIG. 16.
Figure 18:
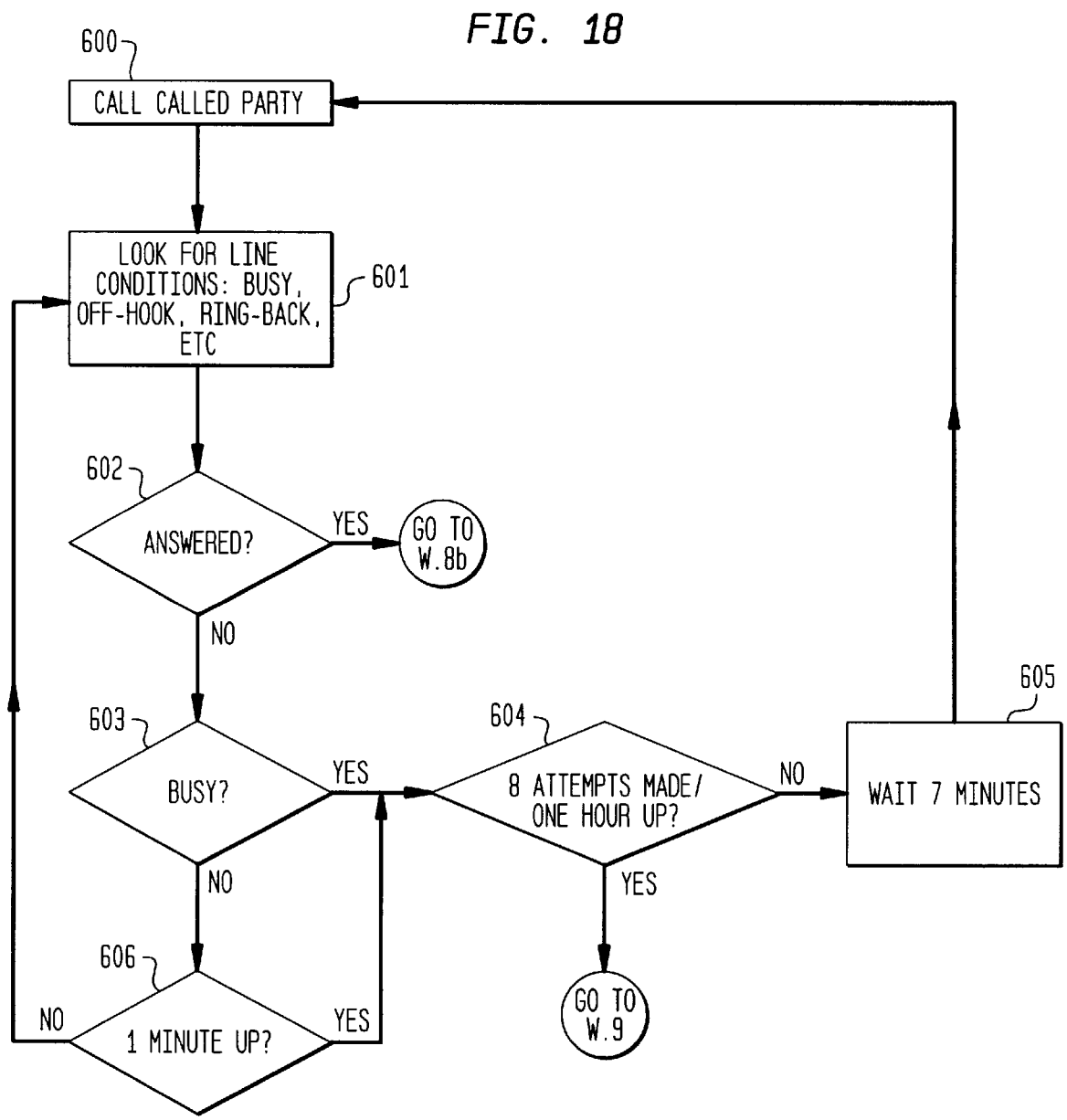
FIG. 18 is a flow chart illustrating the process flow of the call back feature in accordance with the present invention.

Turning now to FIG. 17, the calling party has the option, in accordance with the principles of the present invention, to record a spoken name for use in the callback option. A prompt at step 500 requests the calling party to leave a name or to press a particular key, for example the "pound" key, if no name is to be recorded. A determination is made at step 501 whether or not the particular key, in this example, the "pound" key, has been entered. If it has been entered, the process continues to step 502 where the calling party's telephone number is entered instead of their name. If the "pound" key has not been entered, a prompt is provided to the calling party to record their name after the tone at step 503. The process records the caller's name at step 504 up to a predetermined number of seconds. At step 505, the calling party can record the name of the person they want to receive this callback request. If there is no particular person at the called party's number that the calling party would like to receive the callback request, a predetermined key can be entered, for example, the "pound" key, and this step may be bypassed. In step 506 the system analyzes the entered response. If "yes", the calling party's telephone number is recorded in place of their name at step 507. If the "pound" key was not entered in response to the prompt at step 505, an additional prompt is provided to the calling party to record their name after the tone at step 508 and the name is recorded at step 509. At step 510, the system prompts the calling party to terminate the call and the call is terminated at step 511. Unlike prior systems, the present system allows the calling party to record their spoken name, the name of the called party which they would like to receive the callback request, as well as entering a different telephone number to receive the callback once it has been initiated.

FIGS. 18–22 illustrate the process flow of the callback feature to the called party who initiated the callback request. When the called party picks up the phone, they will receive information corresponding to the callback request entered by the calling party as previously described. Once the called party is notified of the callback request by the called party, the system in accordance with the present invention attempts to call the called party a predetermined number of times within a time period. For example, the system may attempt to call the called party 8 times for one hour. The number of times a callback is attempted as well as the time period during which the callback is attempted may vary. At step 600 the system attempts to call the called party. At step 601 the system determines the condition of telephone line of the called party. For example, the called party's line may be busy, off-hook, or may not be answered. A determination is made at step 602 whether the callback is answered by the calling party. If the call is answered the system continues to subprocess W.8.d. If the calling party's telephone line is busy, as determined at step 603, the system attempts to place the callback for a predetermined number of times at step 604. If the predetermined number of attempts has been completed the process continues at subprocess W.9. Alternatively, after the number of attempts in step 604 is completed, a wait time can be initiated at step 605 after which the process returns to step 600. If the calling party's line has not been answered and is not busy, the system waits a predetermined length of time, for example, one minute, at step 606 and return to step 601.

Figure 19:
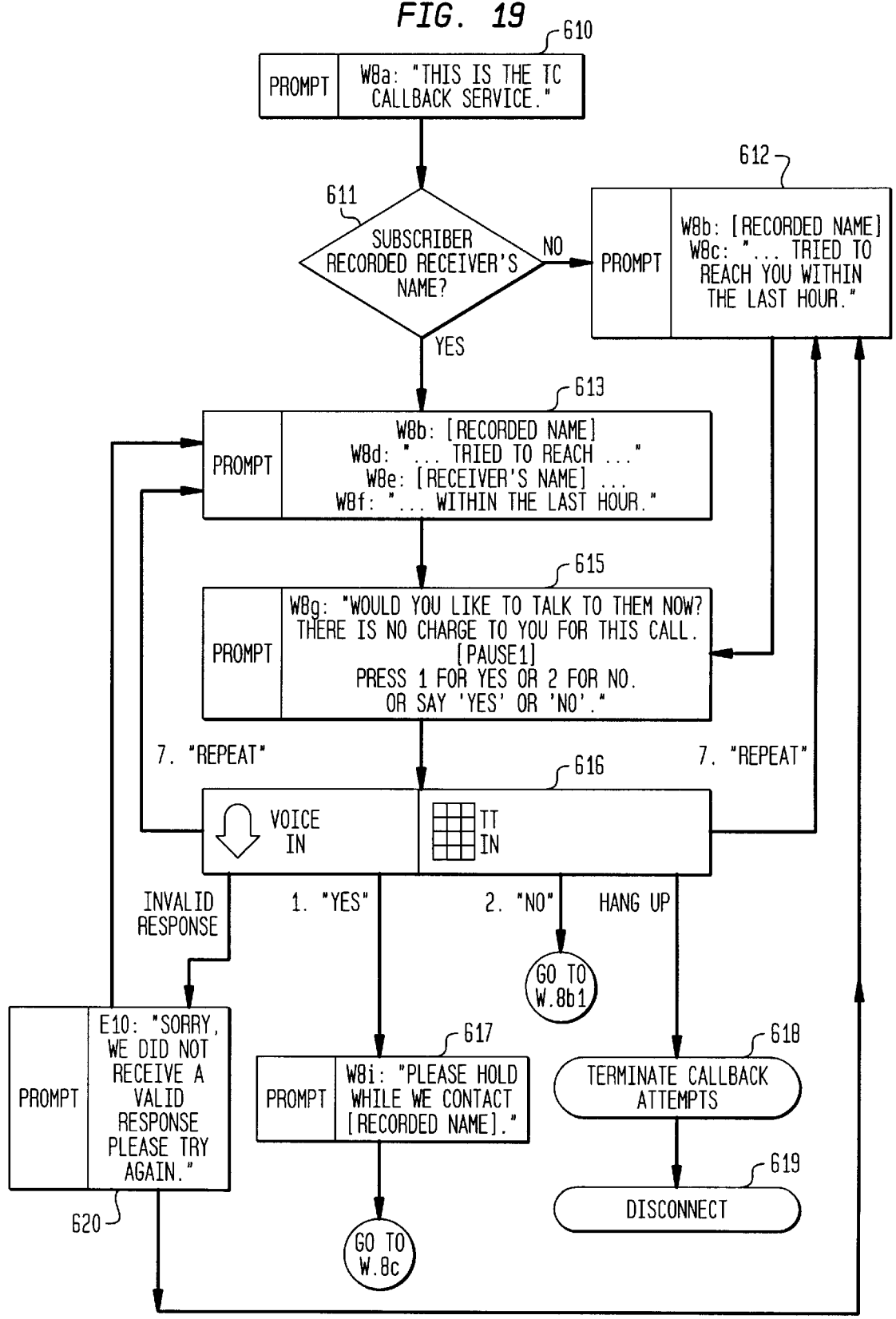
FIG. 19 is a subprocess related to the process of FIG. 18.

Turning now to FIG. 19, once the called party has been reached a prompt at step 610 is provided to the called party notifying them that a callback request has been entered for their telephone number. The system continues to step 611 where it is determined if the calling party has recorded the name of the called party to receive the callback feature. A determination is made at step 612 whether the called party's name has been recorded and the process continues to step 615. If the calling party's name has been recorded the process continues to step 613 where the called party is advised that someone tried to reach them within a predetermined period of time, for example, the last hour. At step 615 the called party is asked whether they would like to talk to the calling party at that time. Step 616 analyzes the called party's response to the prompt in step 615. For example, if the number "1" or the spoken word "yes" is received at step 616, the process continues to step 617 where the calling party's recorded name is announced and the process continues to subprocess W.8.c. If, for example the number "2" or the spoken response "no" is received at step 616, the process continues to subprocess W.8.b.1. If step 616 detects that the calling party has hung up, the callback attempts are terminated at step 618 and the telephone call is disconnected at step 619. If an invalid response is received at step 616 a prompt at step 620 notifies the called party that a valid response is not received and the process returns to step 613. If an input of "7" or the spoken equivalent is received at step 615 and the name has been recorded, the process returns to step 612. If an input of or the spoken equivalent is received at step 615 and the name has not been recorded, the process returns to step 613.

Figure 20:
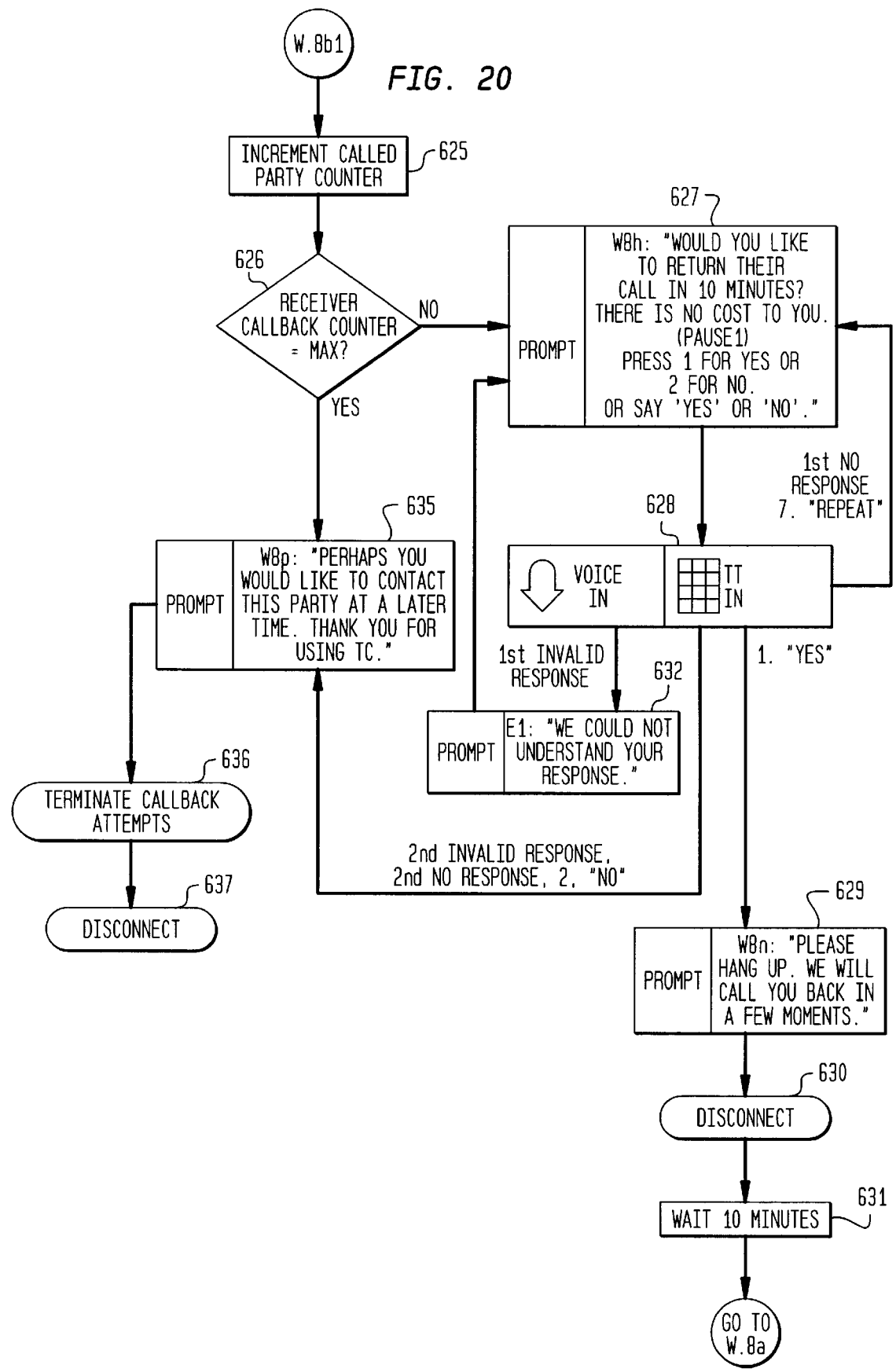
FIG. 20 is a subprocess related to the process of FIG. 19.

FIG. 20 illustrates subprocess W.8b where an increment called party counter at step 625 is initiated. A determination is made at step 626 whether the receiver callback counter is equal to a predetermined value, for example, the number "2". If it is not equal to the predetermined value, the system proceeds to step 627 where the called party is asked whether they would like to return the calling party's telephone call within a predetermined amount of time, for example, 10 minutes. The responses to step 627 are analyzed at step 628. A response by the called party of the number "1" or a spoken "yes," forwards the process to step 629 where the called party is requested to hang up and they will receive a callback in a few moments. The caller is then disconnected at step 630 and a counter is initiated for a predetermined number of times, for example, 10 minutes. At step 631 the process is forwarded to subprocess W.8.a. If an invalid response is received at step 628 a prompt is provided to the called party at step 632 and the process is returned to step 627. If a second invalid response is received at step 628, the process is forwarded to step 635 where the called party is asked if they would like to contact the calling party at a later time. The callback attempts are then terminated at step 636 and the call is disconnected at step 637. If the receiver callback counter at step 626 is equal to a predetermined value, for example "2", the process is forwarded to step 635 and proceeds as described above.

Figure 21:
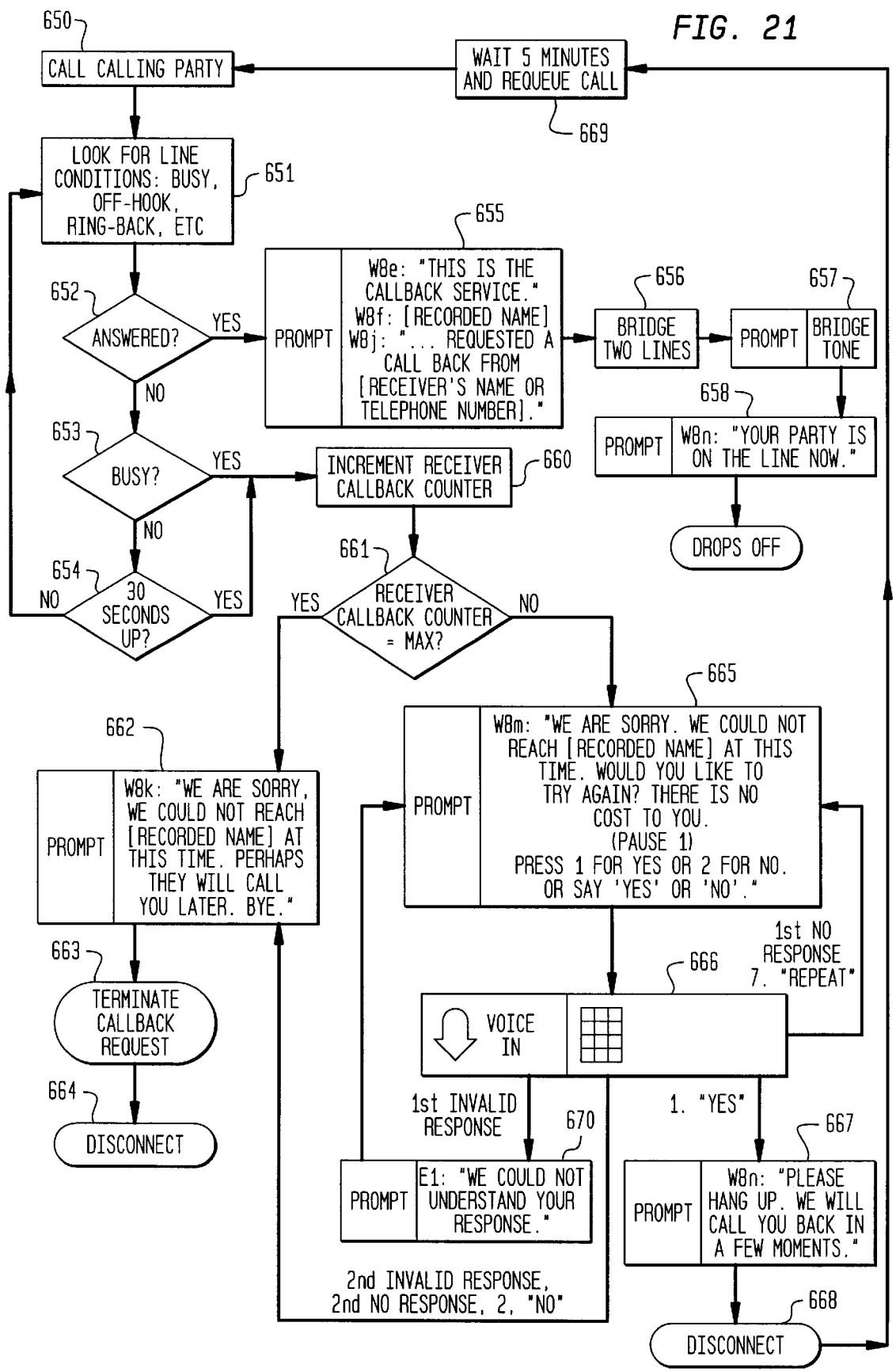
FIG. 21 is a subprocess related to the process of FIG. 19

Turning now to FIG. 21 where the callback feature is initiated thereby attempting to contact the calling party at step 650. The system detects the status of the calling party's line at steps 651, 652, 653 and 654 in a similar manner to that described with reference to steps 601, 602, 603 and 606 in FIG. 18. If the callback is answered by the calling party at step 652 the system provides a prompt at step 655 that the callback is being processed. At step 656 the calling party and called party's lines are bridged. A bridge tie is received at step 657 and the system provides a prompt at step 658 that the called party is now on the line. If the line is busy as determined in step 653, the increment receiver callback counter is initiated at step 660. A determination is made at step 661 of the number of times the receiver callback counter has been initiated. If the callback counter is equal to a predetermined maximum, the system provides a prompt that the called party could not be reached at step 662. The callback request is terminated at step 663 and the telephone connection is terminated at step 664. If the receiver callback counter is not equal to the predetermined maximum, the system proceeds to step 665 where the called party receives a prompt that the calling party could not be reached. The responses received in step 666 are analyzed to determine their validity. If the called party would like to contact the calling party again, by entering a predetermined value such as pressing "1" on the telephone keypad, or saying "yes," the system provides a prompt at step 667 notifying the called party that they will be called back by the telecommunications carrier in a few moments and the telephone call is disconnected at step 668. The process is then forwarded to step 669 where the call is queued for a period of time, for example 5 minutes, and the system returns to step 650. If an invalid response is received at step 666 the prompt is provided at step 670 and the process returns to step 665. If at step 666 no response is received the process returns to step 665.

Figure 22:
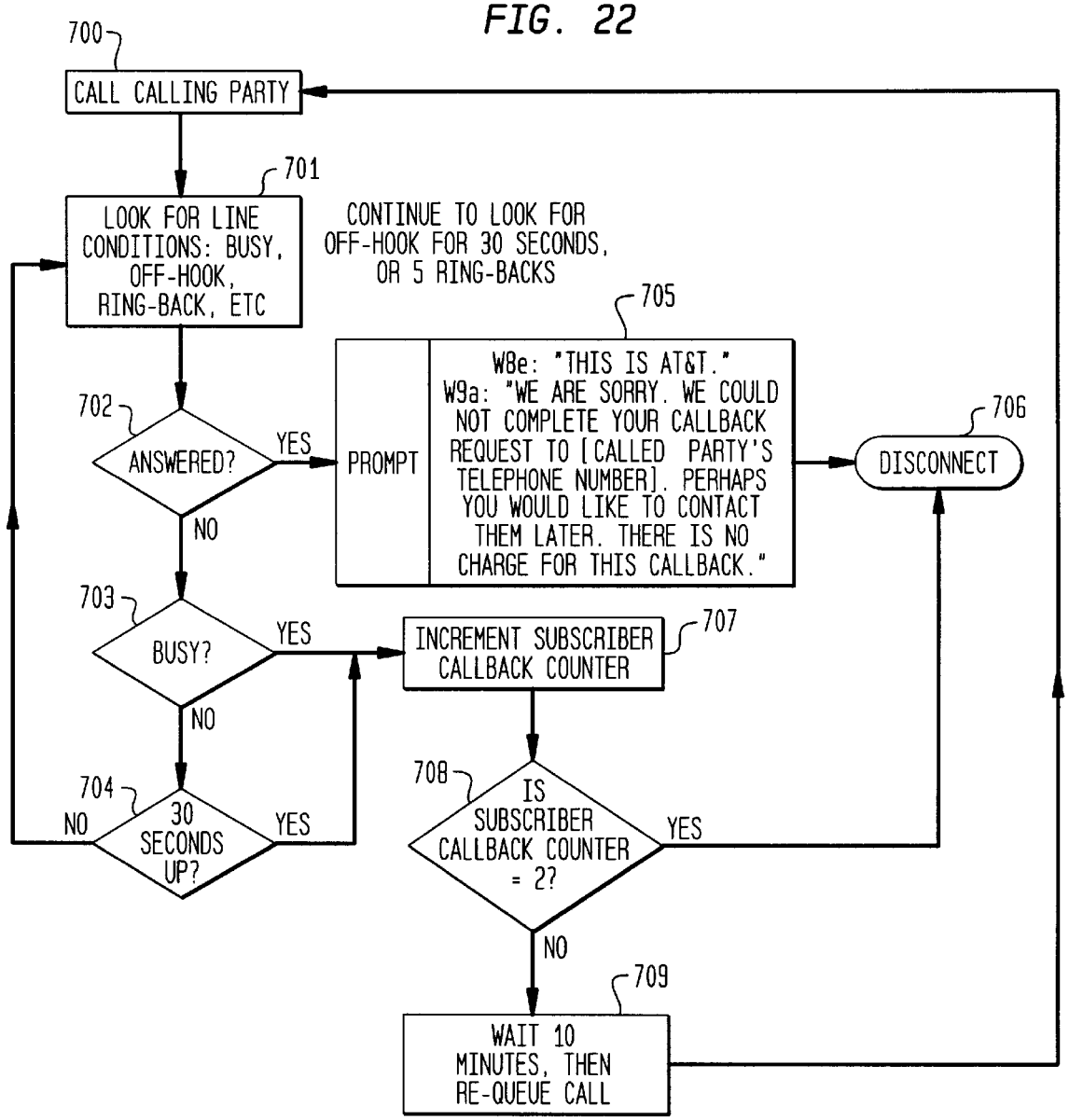
FIG. 22 is a flow chart illustrating a subprocess for notifying a calling party of a call back attempt.

Turning to FIG. 22 which illustrates subprocess W.9 for notifying the calling party of an unsuccessful callback attempt, the calling party is called at step 700. The status of the calling party's telephone line is detected at steps 701, 702, 703 and 704 similar to that previously described. If the calling party answers the phone a prompt is received by the calling party stating that the callback could not be completed at step 705 and the call is disconnected at step 706. If the calling party's line is busy as determined in step 703, an increment subscriber callback counter is initiated at step 707. A determination is made as to the value of the callback counter at step 708. If the callback counter value is equal to a predetermined value, for example 2, the call is disconnected at step 706. If the callback counter is not equal to the predetermined value, the process continues to step 709 and the callback to the calling party is queued for a predetermined number of minutes, for example 10 minutes. The process then returns to step 700.

Figure 23:
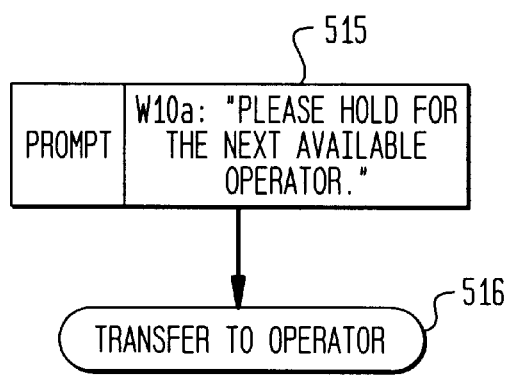
FIG. 23 is a flow chart illustrating a subprocess for obtaining operator assistance.

As referenced in FIGS. 3, 5, 6, 13, 14, 15, and 16, subprocess W.10 is illustrated in FIG. 23 where operator assistance is accessible at various locations in the process. At step 515, a prompt is provided to the party notifying them to please hold on for the next available operator and the call is transferred to an operator at step 515. In this manner, operator assistance is available during the original call flow and a party is not required to first terminate the call and then obtain operator assistance as required by previous systems.

The present invention has been discussed with reference to a cellular wireless caller. As should be understood, the principles of the present invention apply uniformly to any form of wireless telephony, including for example Personal Communication Services ("PCS"), Advanced Mobile Phone System ("AMPS") service, and digital cellular applications involving Time Division Multiple Access ("TDMA") and/or Code Division Multiple Access ("CDMA").

We claim:

1. A call processing method for call attempts made from a wireless phone associated with a calling party to a called phone, comprising the steps of:

receiving a call attempt from the wireless phone;
   determining whether the call attempt has failed because of a condition corresponding to at least one of the calling party receiving a busy signal, a ring no answer response, a message that the called party's telephone has been changed, and a message that the called party's telephone is out of service;
   providing the calling party with a menu of options during the telephone call connection attempt;
   receiving a response from the calling party corresponding to a selected menu option;
   comparing the received response associated with the desired option with a valid response; and
   processing the desired option during the telephone call connection attempt;
   wherein the above steps are provided to the calling party from within a cellular network associated with the wireless phone.

2. The method according to claim 1, wherein the menu of options includes at least two options selected from the group consisting essentially of storing a message for delivery to the called phone, initiating a call back request to the calling phone, requesting to speak to an operator, and requesting to obtain directory assistance.

3. The method of claim 2, wherein the call back option includes periodic call attempts to the called phone for a predetermined period of time.

4. The method according to claim 2, wherein the method further includes a step of receiving from the calling party identification of a telephone number at which a party at the called phone should attempt a call back.

5. The method according to claim 4, further comprising a step of, once the called phone is reached, attempting a second call from the called phone to the wireless phone.

6. The method of claim 5, further including the steps of:
   locating a cell associated with the wireless phone at the time of the second call attempt; and
   once located, connecting the called phone with the wireless phone at the cell.

7. The method according to claim 2, further comprising steps of, when the call back option is selected:
   recording identification information of the calling party, attempting to reach the called phone, and
   when the called phone is reached, playing the information to a party at the called phone.

8. The method according to claim 7, wherein the identification information includes a name of the calling party.

9. The method of claim 2, further comprising a step of, when the stored message option is selected, storing a name of a party at the called phone to whom the call attempt was intended.

10. The method according to claim 1, wherein the step of receiving a response includes a step of receiving a dialed number from the wireless phone.

11. The method according to claim 1, wherein the step of receiving a response includes a step of receiving speech from the wireless phone.

12. The method of claim 1, further comprising steps of:
    determining a first time zone at the wireless phone at the time of the call attempt,
    determining a second time zone at a location of the called phone,
    comparing the time zones, and
    when the time zones are different, announcing a time of day at the second time zone to the calling party.

13. The method of claim 12, wherein the time zone of the wireless phone is determined according to steps of:
    receiving a billing identifier from a cellular switch communicating with the wireless phone,
    identifying the cellular switch,
    referring the cellular switch's identity to an index of cellular switches, and
    retrieving from the index an identifier of the time zone at the cellular switch.

14. The method of claim 12, where in the time zone of the wireless phone is determined according to steps of:
    receiving communication from a cellular switch communicating with the wireless phone,
    identifying a communication path over which the communication from the cellular switch is received,
    identifying th e cellular switch from the communication path ,
    referring the cellular switch's identity to an index of cellular switches, and
    retrieving from the index an identifier of the time zone at the cellular switch.

15. The method of claim 12, wherein the time zone of the wireless phone is determined according to steps of:
    receiving a billing reference number representative of the attempted call,
    identifying from the billing reference number a cellular switch in communication with the wireless phone,
    referring the cellular switch's identity to an index of cellular switches, and
    retrieving from the index an identifier of the time zone at the cellular switch.

16. A telephone system that processes failed call attempts, comprising:
    a wireless receiver that receives a call attempt request from a wireless phone identifying a phone to be called;
    a communication system that places the call attempt to the called phone;
    a processor, provided in one of the wireless receiver and the communication system, responsive to a failure to complete the call attempt that:
    determines a time zone a the wireless phone;
    determines a time zone at a location of the called phone;
    compares the time zones;

when the time zones are different, causes a time of day to be announced to a calling party at the wireless phone;

provides during the telephone call connection attempt a menu of options to the calling party if the call attempt fails because the calling party receives either a busy signal, a ring no answer response, a message that the called party's telephone has been changed or a message that the called party's telephone is out of service; and processing a selected option during the telephone call connection attempt.

17. The system of claim 16, further including means for announcing the menu of options to the calling party.

18. The system of claim 16, further including means for receiving a response indicating the selected option.

19. The system of claim 18, wherein the processor further compares the selected option with a set of valid responses corresponding to the menu options.

20. The system of claim 16, wherein the processor is provided in the receiver.

21. The system of claim 16, wherein the processor is provided in the communication system.

22. The telephone system of claim 16, wherein the communication system is a cellular network.

23. In a communication network, a method of determining a time zone at a wireless phone, comprising steps of:

receiving a billing identifier from a cellular switch communicating with the wireless phone, identifying the cellular switch, referring the cellular switch's identity to an index of cellular switches, and retrieving from the index an identifier of the time zone at the cellular switch.

24. In a communication network, a method of determining a time zone at a wireless phone, comprising steps of:

receiving communications from a cellular switch communicating with the wireless phone, identifying a communication path over which the communication from the cellular switch is received, identifying the cellular switch from the communication path, referring the cellular switch's identity to an index of cellular switches, and retrieving from the index an identifier of the time zone at the cellular switch.

25. In a communication network, a method of determining a time zone at a wireless phone, comprising steps of:

receiving a billing reference number representative of the attempted call, identifying from the billing reference number a cellular switch in communication with the wireless phone, referring the cellular switch's identity to an index of cellular switches, and retrieving from the index an identifier of the time zone at the cellular switch.

* * * * *